United States Patent [19]

Minowa et al.

[11] Patent Number: 5,643,133
[45] Date of Patent: *Jul. 1, 1997

[54] CHANGE GEAR CONTROL DEVICE USING ACCELERATION AND GEAR RATIO AS PARAMETERS FOR AUTOMATIC TRANSMISSION IN A MOTOR VEHICLE AND THE METHOD THEREFOR

[75] Inventors: Toshimichi Minowa, Toukai-mura; Hiroshi Kimura, Hitachi; Yoshiyuki Yoshida, Yokohama; Yoshishige Ohyama; Yutaka Nishimura, both of Katsuta, all of Japan

[73] Assignee: Hitachi, Ltd., Tokyo, Japan

[ * ] Notice: The term of this patent shall not extend beyond the expiration date of Pat. No. 5,470,290.

[21] Appl. No.: 189,782

[22] Filed: Feb. 1, 1994

Related U.S. Application Data

[63] Continuation-in-part of Ser. No. 107,018, Aug. 17, 1993, Pat. No. 5,470,290, which is a continuation-in-part of Ser. No. 840,816, Feb. 25, 1992, Pat. No. 5,235,876.

[30] Foreign Application Priority Data

Feb. 25, 1991 [JP] Japan .................. 3-50148

[51] Int. Cl.$^6$ .................. F16H 61/04; F16H 59/18; B60K 41/08
[52] U.S. Cl. .................. 477/107; 477/109; 477/110; 477/102
[58] Field of Search .................. 477/107, 109, 477/97, 110, 111, 102; 123/344

[56] References Cited

U.S. PATENT DOCUMENTS

| | | | |
|---|---|---|---|
| 4,102,222 | 7/1978 | Miller et al. | 477/120 |
| 4,625,590 | 12/1986 | Muller | 477/120 |
| 4,677,880 | 7/1987 | Hattori et al. | 477/109 X |
| 4,679,145 | 7/1987 | Breck et al. | 364/424.1 |
| 4,732,130 | 3/1988 | Suzuki | 477/111 X |
| 4,739,483 | 4/1988 | Ina et al. | 364/424.1 |
| 4,788,892 | 12/1988 | Komoda et al. | 477/120 |
| 4,823,642 | 4/1989 | Iwaki et al. | 477/111 |
| 4,891,759 | 1/1990 | Kato | 477/107 X |
| 4,893,526 | 1/1990 | Tokero | 477/43 |
| 4,930,374 | 6/1990 | Simonyi et al. | 477/62 |
| 4,945,483 | 7/1990 | Tokaro | 364/424.1 |
| 5,025,684 | 6/1991 | Stehle et al. | 477/62 |
| 5,035,160 | 7/1991 | Morita | 477/154 |
| 5,067,374 | 11/1991 | Sakai et al. | 477/121 |
| 5,113,721 | 5/1992 | Polly | 477/80 |
| 5,129,288 | 7/1992 | Sasaki et al. | 477/120 |
| 5,150,635 | 9/1992 | Minowa et al. | 477/43 |
| 5,209,218 | 5/1993 | Miyashita et al. | 477/111 X |
| 5,231,897 | 8/1993 | Morita | 477/120 |
| 5,295,416 | 3/1994 | Miyashita et al. | 477/110 X |
| 5,309,791 | 5/1994 | Takada et al. | 477/102 X |
| 5,319,555 | 6/1994 | Iwaki et al. | 364/424.1 |

FOREIGN PATENT DOCUMENTS

| | | | |
|---|---|---|---|
| 0385438A2 | 2/1990 | European Pat. Off. | |
| 559342 | 9/1993 | European Pat. Off. | 477/109 |
| 3023646 | 1/1981 | Germany. | |
| 3621674A1 | 6/1986 | Germany. | |
| 3922040A1 | 7/1989 | Germany. | |
| 4110366 | 10/1991 | Germany | 477/109 |
| 359134338 | 8/1984 | Japan | 477/111 |
| 402088333 | 3/1990 | Japan | 477/109 |
| 2052651 | 1/1981 | United Kingdom. | |
| 2248660 | 4/1992 | United Kingdom | 477/109 |

OTHER PUBLICATIONS

JP-1-21-255 (A), Patents Abstracts of Japan, M-823 May 10, 1989 vol. 13/No. 194.
JP-1-21-256 (A), Patents Abstracts of Japan, M-823 May 10, 1989 vol. 13/No. 194.

*Primary Examiner*—Khoi Q. Ta
*Attorney, Agent, or Firm*—Antonelli, Terry, Stout & Kraus, LLP

[57] ABSTRACT

A change gear control device is provided for an automatic transmission in a motor vehicle propelled by an internal combustion engine which is operated with an air/fuel mixture having air/fuel ratios ranging from a fuel rich air/fuel ratio to a fuel lean air/fuel ratio depending on driving conditions of the motor vehicle. In this device a first detector detects an engine torque of the internal combustion engine and a second detector detects a vehicle speed of the motor vehicle. A processor processes transmission gear ratios for the automatic transmission. In particular, the processor reads the detected engine torque from the first detector and the detected vehicle speed from the second detector, determines a new transmission gear ratio based upon the engine torque and the vehicle speed, and outputs a signal representing the new transmission gear ratio to the automatic transmission, whereby a gear shifting operation is effected at a timing based on an engine torque variation due to an operating air/fuel ratio change.

10 Claims, 25 Drawing Sheets

THROTTLE VALVE OPENING CONSTANT
ENGINE SPEED CONSTANT

THROTTLE VALVE OPENING CONSTANT

CHANGE GEAR CONTROL DEVICE USING ACCELERATION AND GEAR RATIO AS PARAMETERS FOR AUTOMATIC TRANSMISSION IN A MOTOR VEHICLE AND THE METHOD THEREFOR

REFERENCE TO RELATED APPLICATIONS

This application is a continuation in part of application Ser. No. 08/107,018 filed Aug. 17, 1993, and now U.S. Pat. No. 5,473,290 issued Nov. 28, 1995 which, in turn, is a continuation in part of Ser. No. 07/840,816 filed Feb. 25, 1992, now U.S. Pat. No. 5,235,876 issued Aug. 17, 1993.

BACKGROUND OF THE INVENTION

The present invention relates to a control device for a motor vehicle provided with a transmission mechanism, and in particular, relates to a change gear control device suitable for controlling an automatic transmission in a motor vehicle provided with a torque converter.

Conventional change gear control devices for automatic transmissions in motor vehicles are, for example, disclosed in JP-A-51-44763(1976) and JP-A-62-261745(1987) wherein a vehicle speed and a throttle valve opening degree are detected in a form of electrical signals and a transmission gear ratio appropriate to the instant vehicle speed and the throttle valve opening degree is selected among a predetermined change gear pattern by making use of the vehicle speed and the throttle valve opening degree as variables and further wherein a plurality of change gear patterns such as an economic type driving pattern and a sporty type driving pattern are prepared and are switched via change gear pattern selection operation by the driver.

With the above conventional change gear control devices, an intention of a driver was not sufficiently reflected to the change gear control device and the transmission gear control was determined by the selected instant transmission gear pattern allowing little modification so that a proper transmission gear ratio correctly reflecting the instant driving condition could not be obtained, therefore the driver had to frequently switch the change gear patterns to meet the instant driving condition which reduced operation facility of the motor vehicle.

SUMMARY OF THE INVENTION

An object of the present invention is to provide a change gear control device for an automatic transmission in a motor vehicle which requires no additional driving operation as in the conventional ones, correctly reflects the intention of the driver and improves the operation facility of the motor vehicle.

For achieving the above object, the change gear control device for an automatic transmission in a motor vehicle according to the present invention is provided with a change gear ratio processing means which determines a transmission gear ratio for the transmission mechanism based upon a detected value of the engine torque and a detected value of the travelling speed of the motor vehicle or based upon a detected value of the engine torque and a detected value of the engine rotation number of the motor vehicle.

The change gear ratio processing means determines the transmission gear ratio for the transmission mechanism based upon the detected engine torque rather than the throttle valve opening degree corresponding to an acceleration pedal depression. The parameter of the engine torque more closely meets the intention of the driver dependent upon respective driving conditions of the motor vehicle than that of the throttle valve opening degree. Namely, even at a same throttle valve opening degree, engine torque shows different rise characteristics due to differences such as vehicle weight and road surface resistance. For this reason, for example, when the weight of the vehicle is heavy, a shift-up timing according to the present invention is considerably delayed under an identical change gear pattern in comparison with that of the conventional change gear control devices which use the throttle valve opening degree for determining the transmission gear ratio. Accordingly, a change gear ratio control for the automatic transmission which highly meets the actual driving conditions of the motor vehicle has been achieved.

According to the present invention, a desirable change gear control for an automatic transmission in a motor vehicle which meets the intention of the driver is obtained without necessitating switching of the change gear patterns in such a manner that the performance of the motor vehicle is fully utilized depending upon driving conditions while permitting an improved operation facility for the driver of the motor vehicle.

DETAILED EXPLANATION OF THE EMBODIMENTS

Hereinbelow, the change gear control device for an automatic transmission in a motor vehicle according to the present invention is explained in detail with reference to the embodiments as shown.

Figure 1:
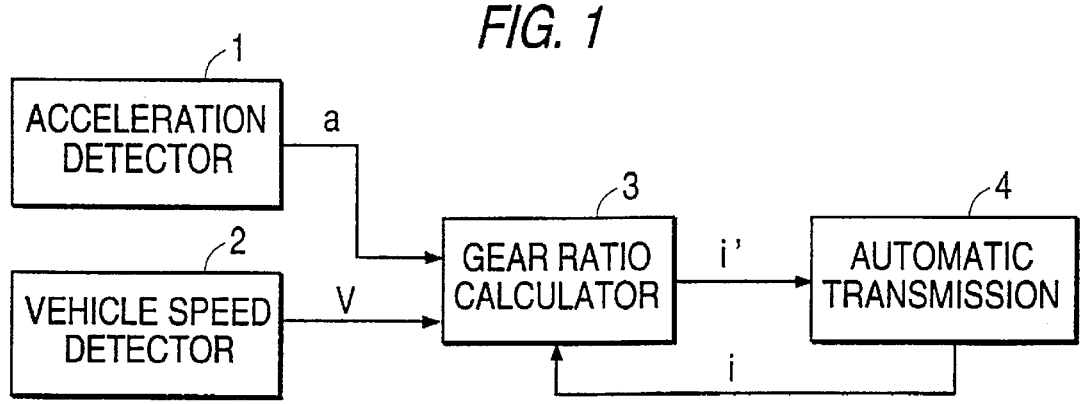
FIG. 1 is a block diagram showing one embodiment of the change gear control device for an automatic transmission in a motor vehicle according to the present invention.

FIG. 1 shows one embodiment of the present invention which comprises an acceleration detector 1, a vehicle travelling speed detector 2, a change gear ratio processor 3 and an automatic transmission 4.

The acceleration detector 1 consists of such as an acceleration sensor and functions to detect a vehicle acceleration a in its travelling direction.

The vehicle travelling speed detector 2 consists of such as a sensor which detects a rotating speed of the vehicle propeller shaft and functions to detect a vehicle travelling speed V.

The change gear ratio processor 3 consists of a microcomputer, determines the engine torque Te based upon the detected acceleration a and calculates a transmission gear ratio with reference to a change gear characteristic map contained therein by making use of the determined engine torque Te and the vehicle travelling speed V as its retrieval inputs.

The automatic transmission 4 consists of a torque converter and a planetary gear mechanism and functions to switch the transmission gear ratio in the driving system disposed between the engine and the driven wheels by making use of a control signal fed from the change gear ratio processor 3.

Now, the operation of the present embodiment is explained with reference to the flow chart shown in FIG. 2. The processing shown in the flow chart is adapted to be performed by the microcomputer in the change gear ratio processor 3 at a predetermined time period via such as a timer interruption and when the process starts, at first in step 20 the vehicle travelling speed V from the vehicle travelling speed detector 2 is read, thereafter, in step 21 the acceleration a from the acceleration detector 1 is read. Further, in step 22 the value of transmission gear ratio i now in use is read from the automatic transmission 4.

Subsequently, in step 23 based upon the acceleration a and the value of instant transmission gear ratio i, the engine torque Te at this moment is calculated. Namely, calculation of Te=f(a, i) is performed. The engine torque Te may be obtained by a predetermined torque map having retrieval inputs of the acceleration a and the value of instant transmission gear ratio i.

Figure 3:
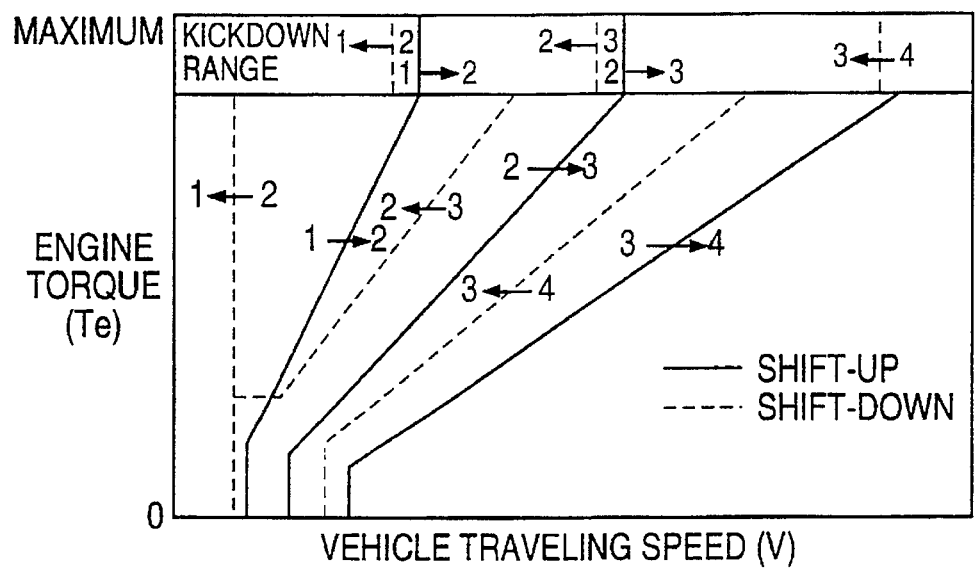
FIG. 3 is a change gear characteristic map used in the embodiment in FIG. 1.

In step 24, whether or not switching of the transmission gear ratio at this moment is necessary is determined by making use of the change gear characteristic map shown in FIG. 3 with reference to the determined engine torque Te, the read vehicle travelling speed V and the read value of the instant transmission gear ratio i and when it is determined that the switching of the transmission gear ratio is necessary, in step 25 based upon the determination in the preceding step a new transmission gear ratio i' is output to the automatic transmission 4 to complete the processing. In other words, when the read value of the instant transmission gear ratio i is at the first gear speed but the point on the change gear characteristic map determined by the determined engine torque Te and the read vehicle travelling speed V locates in a region of the second gear speed, the change gear ratio processor 3 determines to switch the transmission gear ratio from the first gear speed to the second gear speed and output a new transmission gear ratio i corresponding to the second gear speed to the automatic transmission 4.

In the change gear control for the conventional automatic transmission, a predetermined transmission gear ratio was selected in a selected predetermined change gear pattern by making use of the variables of the vehicle travelling speed and the throttle valve opening degree as explained above. Therefore, with the conventional change gear control, it was difficult to correctly switch the transmission gear ratio in response to the variation of driving conditions, in particular, the variation of load on the vehicle during travel. For example, when travelling on a flat road or a gentle downhill road it is considered preferable to hasten the shift-up timing in comparison with a travel on an uphill road in order to improve fuel consumption without sacrificing the driving performance. However, in the conventional change gear control which was determined by making use of the throttle valve opening degree and the vehicle travelling speed, such change gear control could not be realized unless the change gear patterns were switched. Such change gear patterns are similar to the change gear characteristic map shown in FIG. 3 except that the throttle valve opening degree was used as the ordinate variable.

However, in the present embodiment, the change gear control is carried out dependent upon the engine torque, the switching timing of a change in the gear ratio varies even at an identical throttle valve opening degree, and even under an identical change gear pattern the shift-up timing is delayed when the load on the vehicle during travel is heavy and is hastened when the load is light, so that a correct switching of transmission gear ratio depending upon driving conditions of the vehicle is realized to thereby achieve an improvement in driving performance of the vehicle as well as in fuel consumption.

In the present embodiment, the engine torque is determined by calculation by making use of the vehicle acceleration in its travelling direction which is detected by the acceleration detector, such that a special torque sensor is eliminated which minimizes the manufacturing cost increase of the present embodiment. However, in place of the acceleration detector 1 a torque sensor may be used, in such instance the engine torque is directly detected therewith and is inputted to the change gear ratio processor 3.

Figure 4:
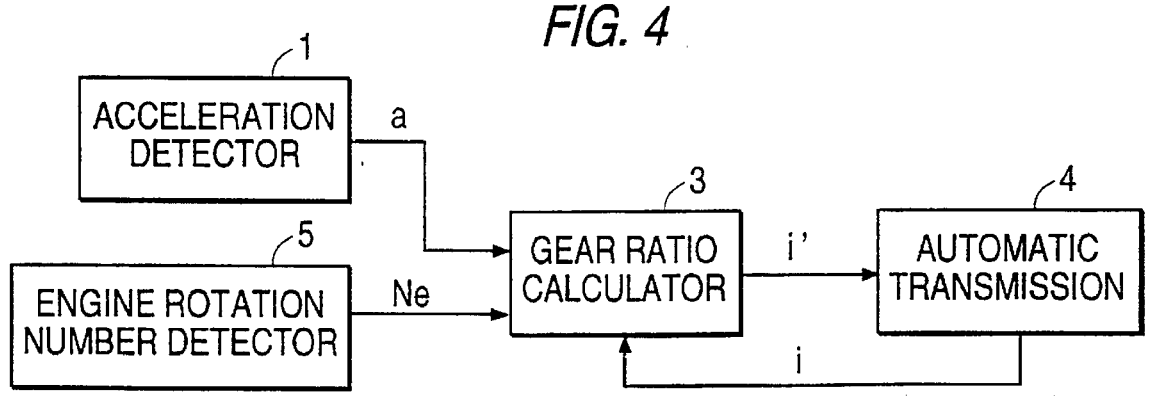
FIG. 4 is a block diagram showing another embodiment of the change gear control device for an automatic transmission in a motor vehicle according to the present invention.

FIG. 4 shows a block diagram of another embodiment according to the present invention wherein the same or equivalent elements as in the first embodiment are designated by the same reference numerals. In FIG. 4 an engine rotation number detector 5 functions to detect an engine rotation number Ne as the name indicates which is constituted to determine the engine rotation number Ne by counting pulses from a pulse generator such as a crank angle sensor mounted on the engine crank shaft.

A difference of the present embodiment shown in FIG. 4 from the first embodiment shown in FIG. 1 is that the engine rotation number detector 5 is provided in place of the vehicle travelling speed detector 2 in FIG. 1 and wherein by making use of the engine rotation number Ne itself other than the vehicle travelling speed V and the engine torque Te a transmission gear ratio is calculated and determined.

Now, the operation of the present embodiment shown in FIG. 4 is explained with reference to the flow chart shown in FIG. 5.

Figure 5:
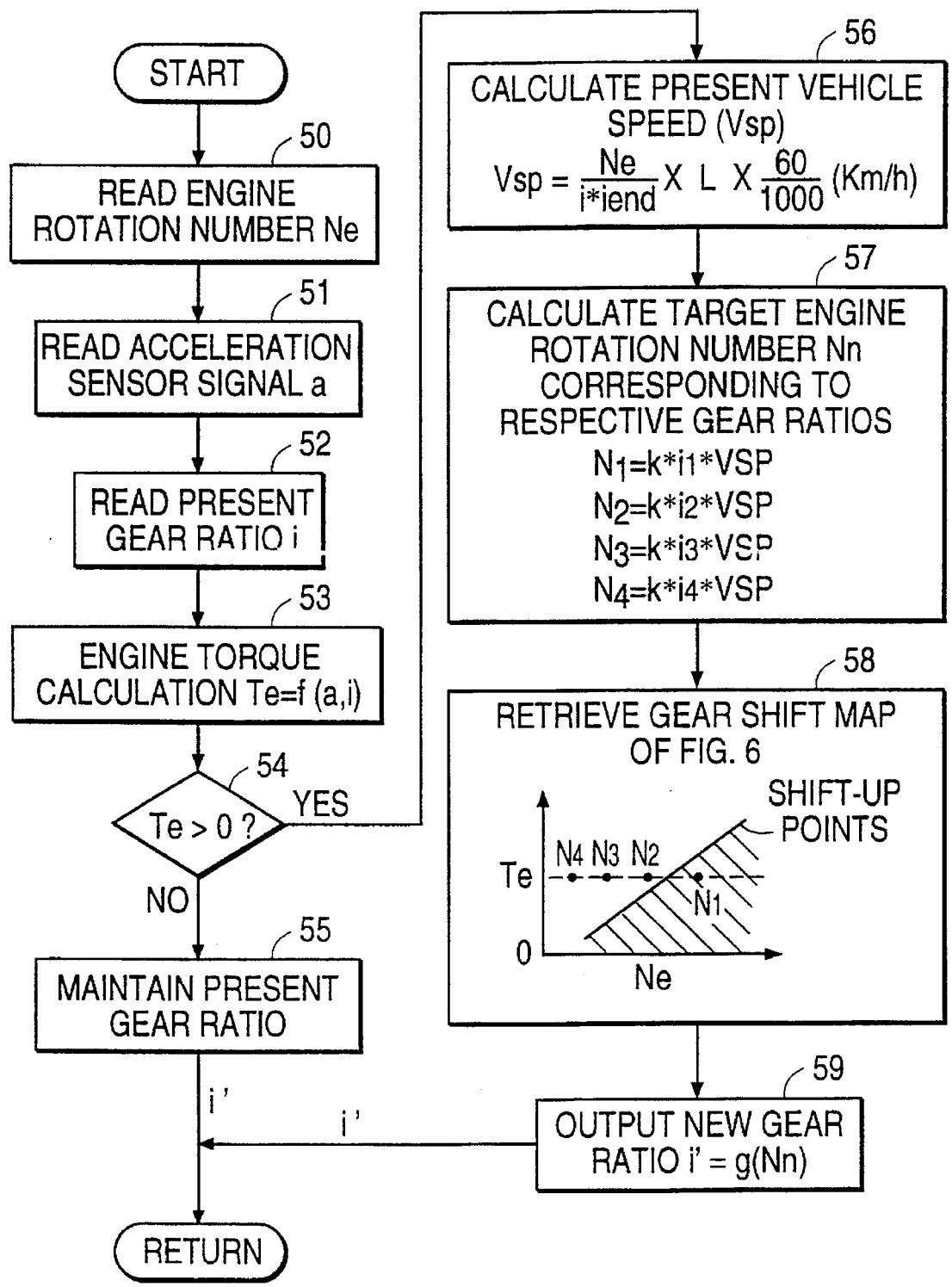
FIG. 5 is a flow chart for explaining the operation of the embodiment shown in FIG. 4.

The processing shown in the flow chart in FIG. 5 is adapted to be performed by a microcomputer in a change gear ratio processor 3 at a predetermined time period via such as a timer interruption. When the process starts, at first stage in steps 50, 51 and 52 an engine rotation number Ne, acceleration a and the instant transmission gear ratio i of the automatic transmission 4 are sequentially read in, and further, in step 53, the engine torque Te is calculated based upon these data. The processing in steps 51 through 53 is the same as that in steps 21 through 23 in FIG. 2 in connection with the first embodiment.

In step 54, it is judged whether or not the engine torque Te now determined indicates a finite value and when the result of the judgment is NO, namely when the engine torque Te is determined zero which implies that no switching of the transmission gear ratio is needed, the process proceeds to step 55 wherein the instant transmission gear ratio i is output as a new transmission gear ratio i' to maintain the instant transmission gear ratio and to complete the processing.

On the other hand, when the result of the judgment in step 54 is YES, namely when the engine torque Te is determined a finite value which implies that switching of the transmission gear ratio may be needed, the process proceeds to steps 56 through 59 to determine a new transmission gear ratio i'. In the present processing the engine torque Te is calculated based upon the acceleration a detected by the acceleration detector 1 so that even if the calculated engine torque Te is zero, the actual engine torque is not necessarily implied to be zero.

In step 56, the present vehicle travelling speed Vsp(Km/h) is calculated based upon the present engine rotation number Ne, the present gear ratio i, the final reduction gear ratio of the differential gear i end, and the outer diameter L(m) of the driving wheel in accordance with the following equation.

$$Vsp=(Ne)/(ix\ i\ end)xLx(60)/(1000) \qquad (1)$$

In step 57, target engine rotation numbers $N_1, N_2, N_3$ and $N_4$ for the respective gear ratios $i_1, i_2, i_3$ and $i_4$ corresponding to the first, second, third and fourth gear speeds are calculated by making use of the calculated Vsp in accordance with the following equations.

$$N_1 = kx\ i_1 \times Vsp$$

$$N_2 = kx\ i_2 \times Vsp$$

$$N_3 = kx\ i_3 \times Vsp$$

$$N_4 = kx\ i_4 \times Vsp \qquad (2)$$

wherein k is a constant.

Figure 6:
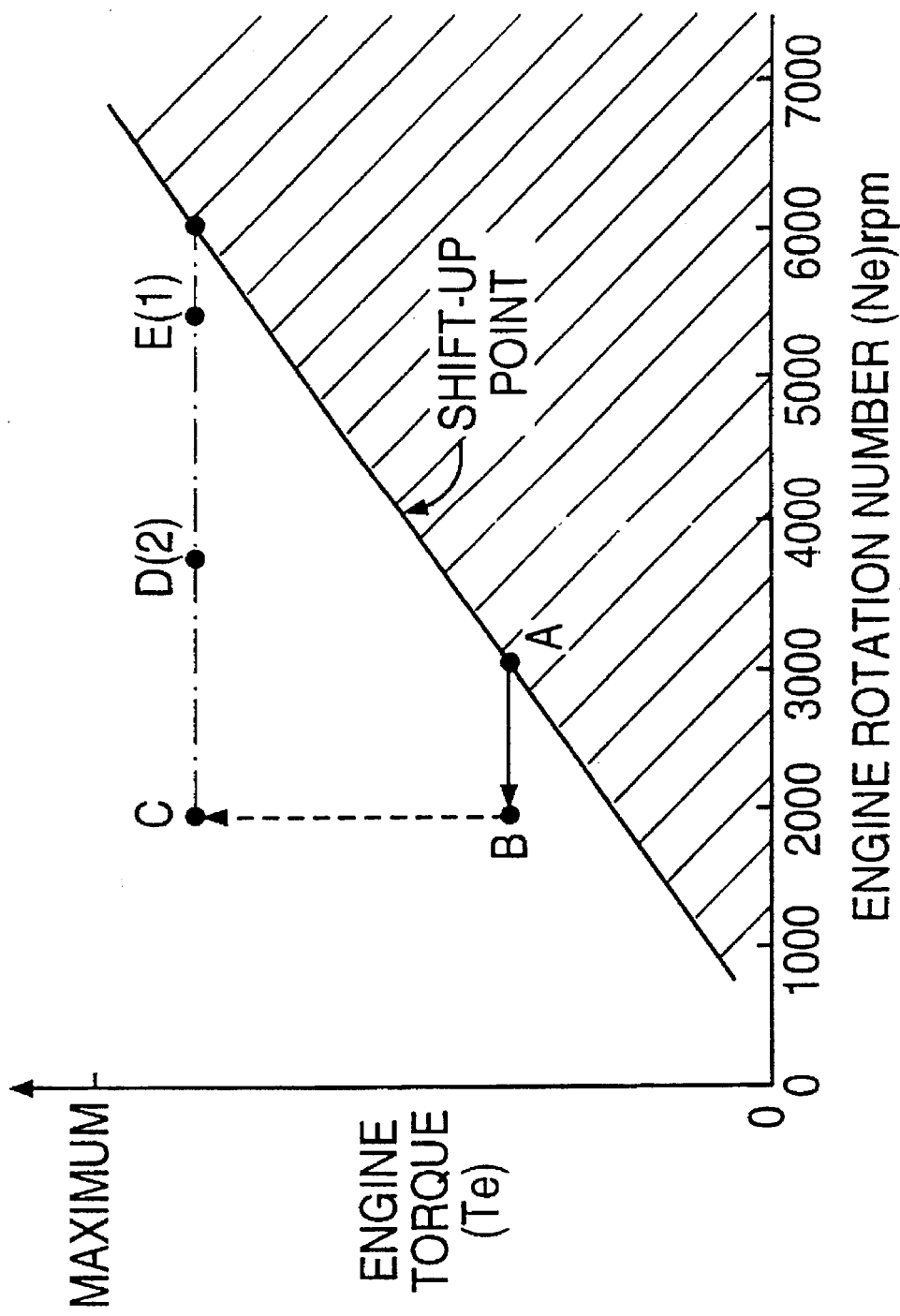
FIG. 6 is another change gear characteristic map used in the embodiment shown in FIG. 4.

Subsequently, in step 58, the change gear characteristic map shown in FIG. 6 is retrieved, in that since the engine torque Te has been determined in step 53, the target engine rotation numbers $N_1, N_2, N_3$ and $N_4$ corresponding to the respective transmission gear ratios can be plotted on the change gear characteristic map as shown in the block of step 58 wherein the solid line indicates shift-up points and the target engine rotation numbers determined by the respective gear ratios above the solid line indicates those to be selectable as a target engine rotation number, and the nearest target engine rotation number to the solid line, in the present instance $N_2$ is selected and outputted to step 59. In step 59, based upon the inputted target engine rotation number $N_2$ a new transmission gear ratio i' is determined and outputted to the automatic transmission to complete the present processing.

Now, the switching operation of the transmission gear ratio by making use of the simple change gear characteristic map shown in FIG. 6 is explained in detail.

When the engine torque Te is on the horizontal line passing through point A, the switching of the transmission gear ratio is caused at the engine rotation number Ne of about 3000(rpm). After the switching of gear ratio the engine rotation number Ne at once reduces to the vicinity of 2000(rpm) and then the engine rotation number Ne again rises up to the point A near 3000(rpm) because the engine torque Te is maintained unchanged and when the engine rotation number reaches the shift-up point indicated by the solid line the automatic transmission is shifted-up again.

On the other hand, when the instant transmission gear ratio i of the automatic transmission 4 is at the third gear speed and at point B on the change gear characteristic map and the engine torque Te suddenly changes up to point C, this implies that the driver wants to generate a large driving torque through shift-down. In other words, the increase of the engine torque Te from point B to point C is initiated by the acceleration pedal depression by the driver. As a result, the acceleration under the instant transmission gear ratio i is increased to thereby cause the engine torque increase. In this instance, via the processing in steps 58 and 59 a new transmission gear ratio i' is provided to shift-down the transmission gear ratio. Namely, since the instant gear ratio i is at the third gear speed position indicated by point C, when the second gear speed corresponding to gear ratio $i_2$ indicated by point D(2) is selected the engine rotation number Ne rises up to slightly below 4000(rpm) and likely when the first gear speed corresponding to gear ratio $i_1$ indicated by point E(1) is selected the engine rotation number Ne rises up to above 5000(rpm) to thereby obtain a large acceleration.

In the present embodiment too, the gear change is carried out dependent upon the engine torque, the switching time of change in gear ratio varies even at an identical throttle valve opening degree, and even under an identical change gear pattern the shift-up timing is delayed when the load on the vehicle during travel is heavy and is hastened when the load is light so that a correct switching of the gear ratio depending upon driving conditions of the vehicle is realized to thereby achieve an improvement in driving performance of the vehicle as well as in fuel consumption.

Figure 7:
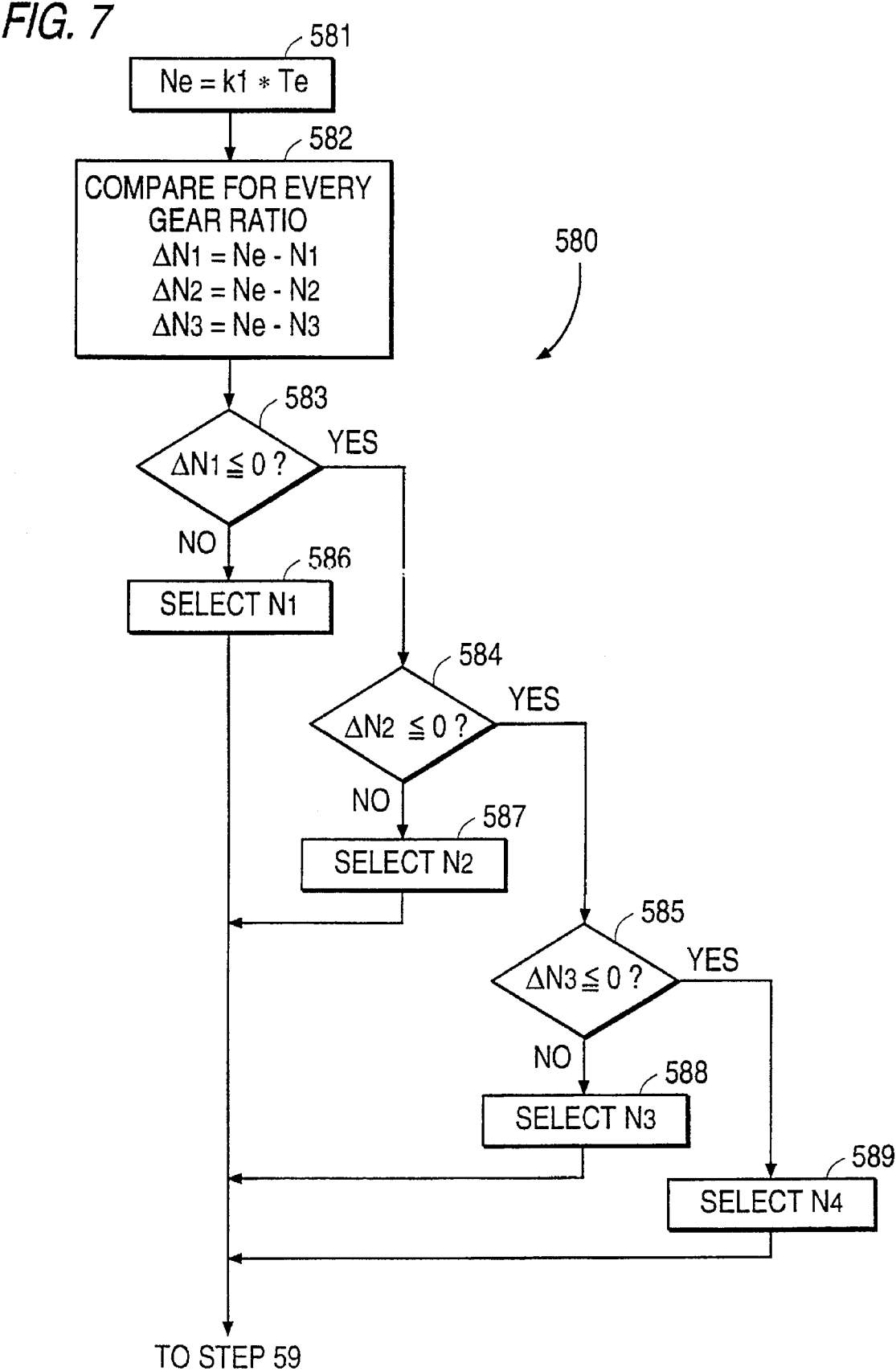
FIG. 7 is a flow chart showing a modification of step 58 in FIG. 5.

FIG. 7 shows a flow chart which is a modification of the processing in step 58 shown in FIG. 5. In step 58, the change gear characteristic map shown in FIG. 6 is used to determine a target engine rotation number Nn. However, in the modified step 580 shown in FIG. 7, instead of using the change gear characteristic map, in step 581 the engine rotation number Ne at the shift-up point is calculated according to the following equation.

$$Ne=k_1 \times Te \qquad (3)$$

wherein k is a constant.

In step 582, the calculated engine rotation number Ne at the shift-up point is compared with the respective target engine rotation numbers $N_1$, $N_2$ and $N_3$ calculated previously to obtain the respective following differences:

$$\Delta N_1 = Ne - N_1$$

$$\Delta N_2 = Ne - N_2$$

$$\Delta N_3 = Ne - N_3 \qquad (4)$$

Via steps 583 through 589, one of the target engine rotation numbers $N_1$, $N_2$, $N_3$ and $N_4$ is selected to determine a new transmission gear ratio i' in step 59.

Figure 8:
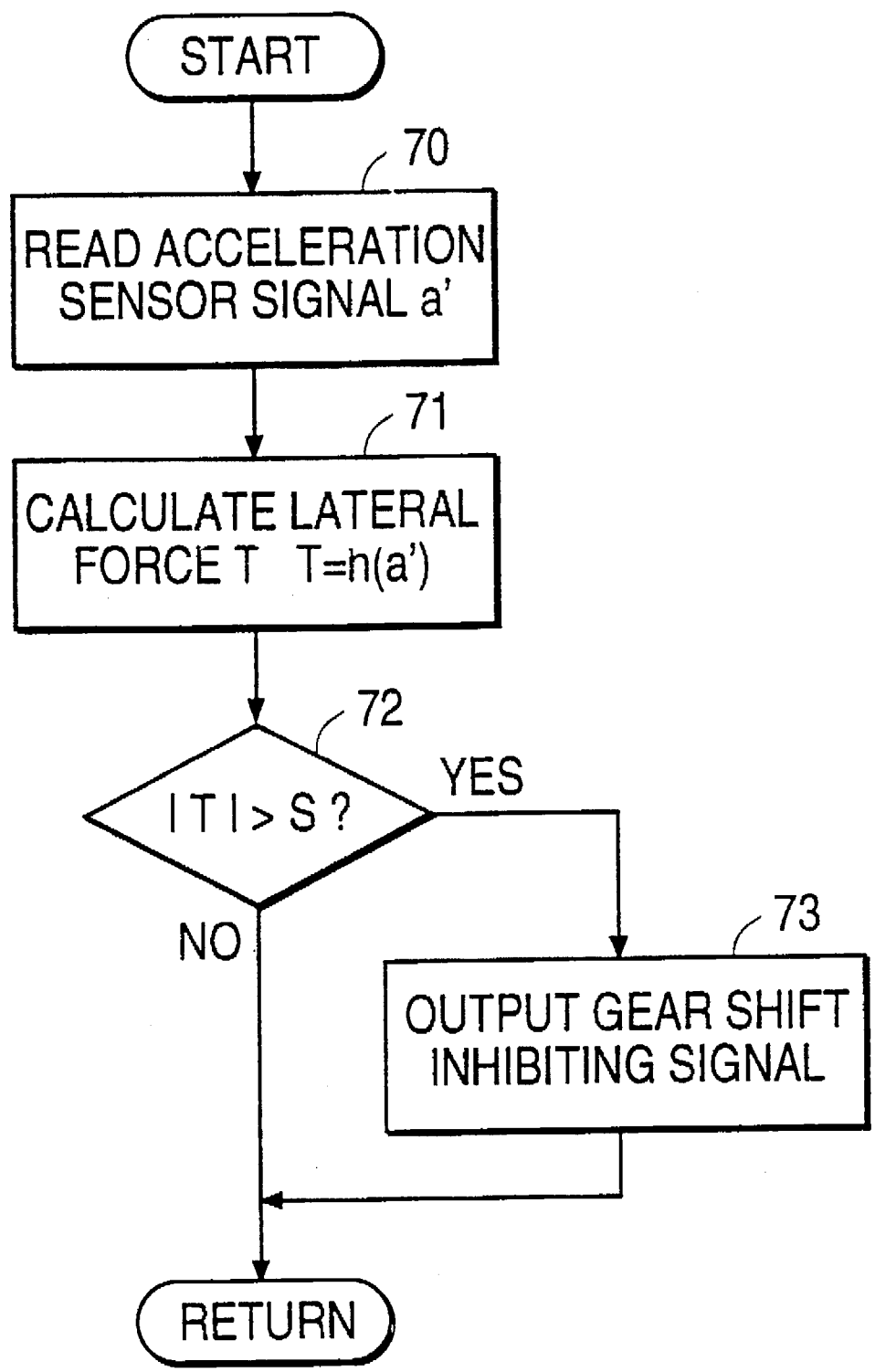
FIG. 8 is a flow chart for explaining a further modification which may be added to the embodiments shown in FIG. 1 and FIG. 4.

A further embodiment which may be added to the first and second embodiments is explained with reference to the flow chart in FIG. 8.

Figure 2:
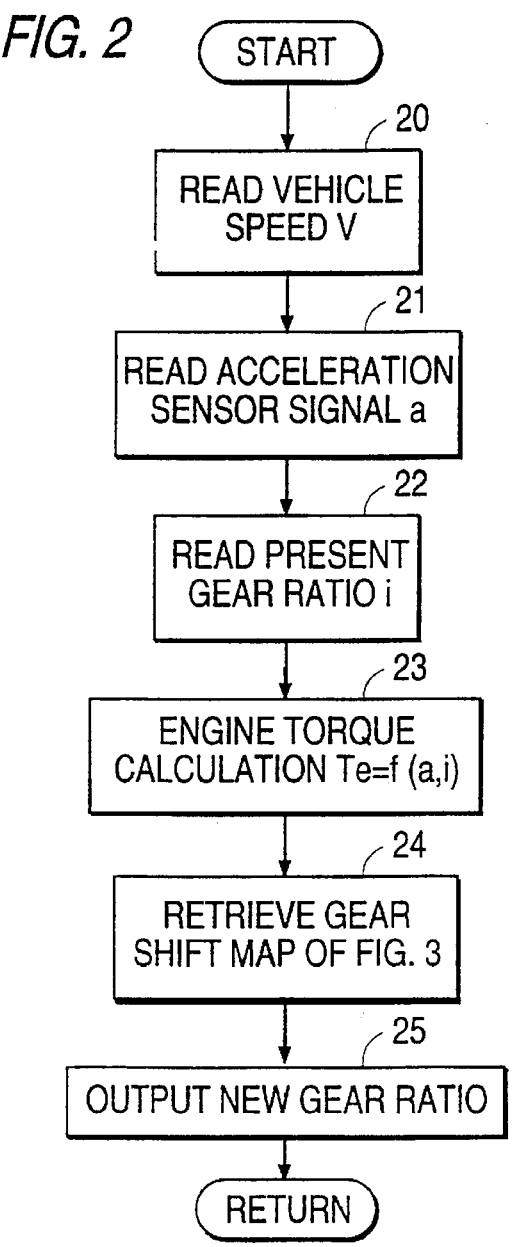
FIG. 2 is a flow chart for explaining the operation of the embodiment shown in FIG. 1.
Figure 1A:
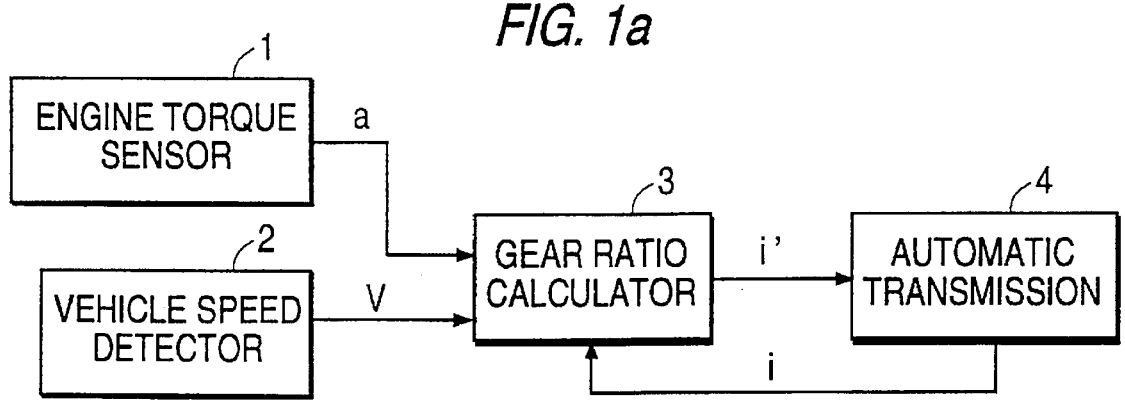
FIG. 1a is an alternative embodiment using a torque sensor.
Figure 2A:
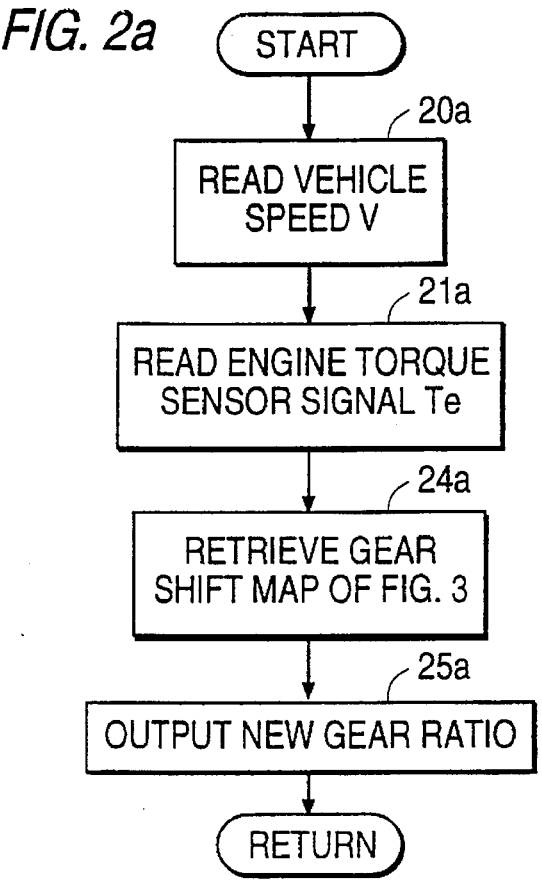
FIG. 2a is a flow chart of the operation of the FIG. 1a embodiment.

In the first and second embodiments, as will be understood from the flow charts shown in FIG. 2 and FIG. 5 explaining the processing in the change gear ratio processor 3, once the change gear ratio processor 3 judges that the transmission gear ratio is to be switched, the judgment is immediately transmitted to the automatic transmission 4 and the gear ratio is switched.

However, when a large lateral force is acting on the vehicle such as when the vehicle is travelling along a sharply curved road at a comparatively high speed, if the switching of the gear ratio is performed the driving stability of the motor vehicle may be endangered.

For preventing such drawback, in the present embodiment, an acceleration sensor which is capable of detecting an acceleration appearing in right and left directions of the vehicle is added, and in step 70 the output a' from the additional acceleration sensor is detected. In step 71 a lateral force T is calculated according to a predetermined function F=h(a'), and further in step 72, it is judged whether or not the absolute value of the lateral force ITI exceeds a predetermined reference value s, and when the judgment result is YES, in that, ITI>s, the process goes to step 73 through which a signal inhibiting switching of the gear ratio is outputted to prevent the switching of the gear ratio in the automatic transmission 4.

Accordingly, with the present embodiment, the switching of the gear ratio is inhibited when a lateral force beyond the predetermined reference value is acting on the vehicle which is experienced such as when the vehicle is travelling along a sharply curved road.

The above embodiment is easily realized without much increase in the manufacturing cost thereof, because in the first and second embodiments an acceleration sensor which detects an acceleration in the vehicle travelling direction is already incorporated. It is only necessary to modify the acceleration sensor to be able to detect an acceleration in the vehicle lateral direction in addition to that in the vehicle travelling direction.

The present invention can be used in combination with any type of internal combustion engine. In particular, it has been discovered that an inherent advantage of the present invention is that it is compatible with an internal combustion engine which is designed to operate over a wide range of air/fuel ratios including fuel lean mixture air/fuel ratios greater than an air/fuel ratio 14.7 of stoichiometry. Conventional automatic transmission change gear control devices cannot operate satisfactorily with such lean fuel mixture air/fuel ratios.

Such an internal combustion engine which is designed to be operable in a condition of a fuel lean air/fuel mixture is hereinafter referred to as a lean burn engine. An example of such an engine is described in an article by David Monroe et al., "Evaluation of a Cu/Zeolite Catalyst to Remove Nox from Lean Exhaust", SAE Technical Paper Series 930737, Mar. 1–5, 1993, pages 195–203, which is hereby incorporated by reference.

Figure 9:
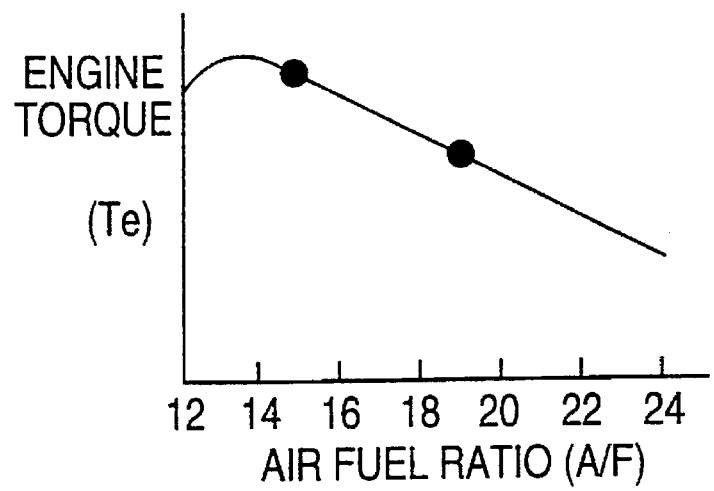
FIG. 9 is an engine torque characteristic curve dependent upon air/fuel ratio (A/F) change under a condition when both throttle valve opening and engine speed are kept constant.

FIG. 9 shows an engine torque characteristic, in particular, a lean burn engine torque characteristic, depending on air fuel ratio (A/F) under a condition when the throttle valve opening and the engine speed are kept constant. As seen from FIG. 9, the available engine torque decreases as the air/fuel ratio increases, that is, when the air/fuel mixture changes to a fuel lean condition.

Figure 10:
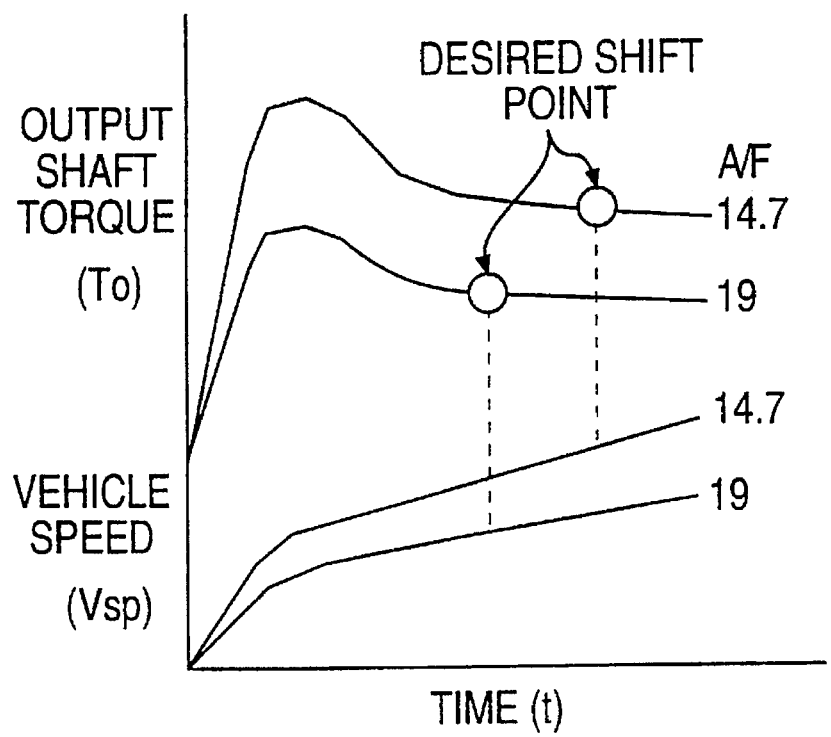
FIG. 10 shows output shaft torque characteristic curves and vehicle speed curves for air/fuel ratios of 14.7 and 19 with respect to time when the throttle valve opening is kept constant.

FIG. 10 shows, respectively, changes of output shaft torque and vehicle speed at air/fuel ratios of 14.7 and 19 with respect to a time when a motor vehicle is started from a vehicle speed of 0 with a substantially constant throttle valve opening. This figure indicates that an available output shaft torque and vehicle speed characteristic with respect to time vary depending on air/fuel ratios, so that an acceleration feeling given to the driver varies depending on the variation of air/fuel ratios even when the throttle valve opening is kept uncharged.

The desired shift points in FIG. 10 indicate that when the engine is operating under a fuel lean condition, for example, at an air/fuel ratio of 19, it is desirable for meeting a driver's intention to effect a gear shifting at a lower speed or earlier timing than when operating under a condition of an air/fuel ratio of 14.7, i.e., at stoichiometry.

Figure 11A:
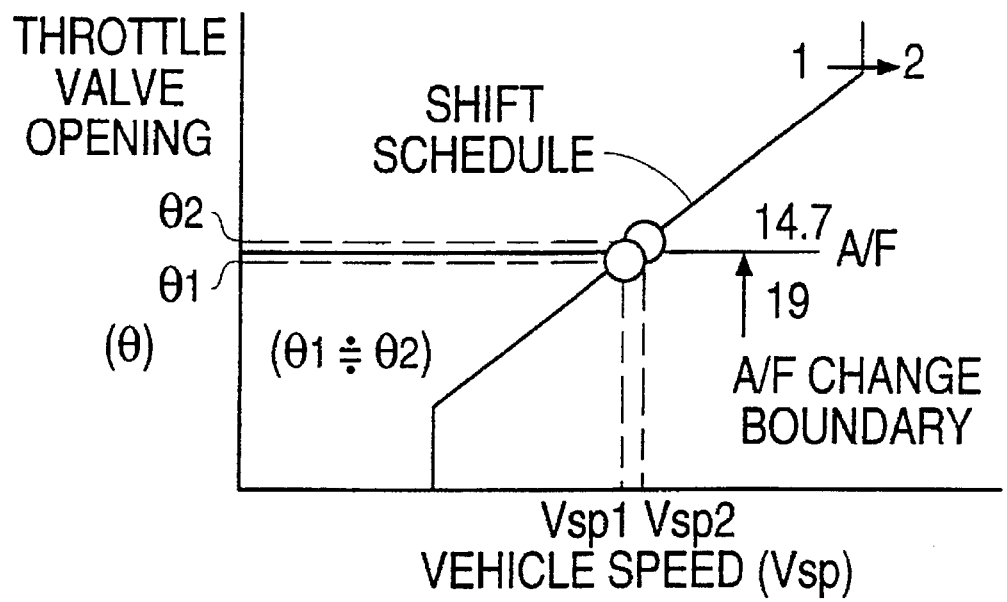
FIG. 11(a) is a diagram prepared by overlapping an A/F change boundary line with a conventional change gear characteristic diagram using throttle valve opening and vehicle speed as change gear parameters for explaining timings of changing gears.
Figure 11B:
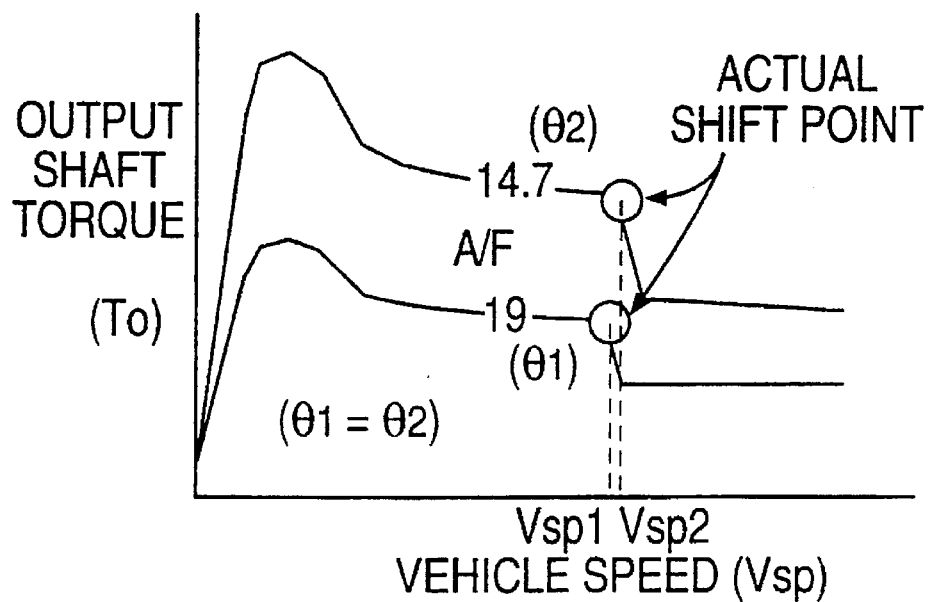
FIG. 11(b) is a graph illustrating a relationship between output shaft torque and vehicle speed for air/fuel ratios of 14.7 and 19 for explaining timings of changing gears when the gear change is performed based on the conventional change gear characteristic diagram as illustrated in FIG. 11(a)

FIG. 11($a$) and FIG. 11($b$) are diagrams for explaining an inconvenience which can arise when the lean burn engine is combined with the conventional automatic transmission which makes use of throttle valve opening and vehicle speed as the gear shifting parameters. These figures assume that an A/F change boundary between 14.7 and 19 runs between throttle valve openings $\Theta1$ and $\Theta2$. As seen from FIG. 11($a$), the gear shifting is caused at vehicle speed Vsp1 for the throttle valve opening $\Theta1$ and at vehicle speed Vsp2 for the throttle valve opening $\Theta2$. Since the throttle valve openings $\Theta1$ and $\Theta2$ are substantially the same, the vehicle speeds Vsp1 and Vsp2 at which the gear shifting is caused are also substantially the same. Assuming that the throttle valve opening fluctuates from $\Theta2$ to $\Theta1$ during operation and crosses the A/F change boundary from 14.7 to 19, the available output shaft torque characteristic suddenly changes from that for A/F of 14.7 to that for A/F of 19, as illustrated in FIG. 11($b$). However, the gear shifting is never caused until the vehicle speed reaches Vsp1 which is substantially the same as Vsp2 since the throttle valve openings $\Theta1$ and $\Theta2$ are substantially the same. As will be understood from FIG. 10, it takes a longer time to reach the vehicle speed Vsp1 according to the output shaft torque characteristic for the A/F of 19. Accordingly, with such a lean burn air/fuel ratio, a linear acceleration feeling cannot be achieved in which the gear shifting is effected at respective vehicle speeds depending upon variation of the output shaft torque characteristics which the driver wants to obtain.

Figure 12A:
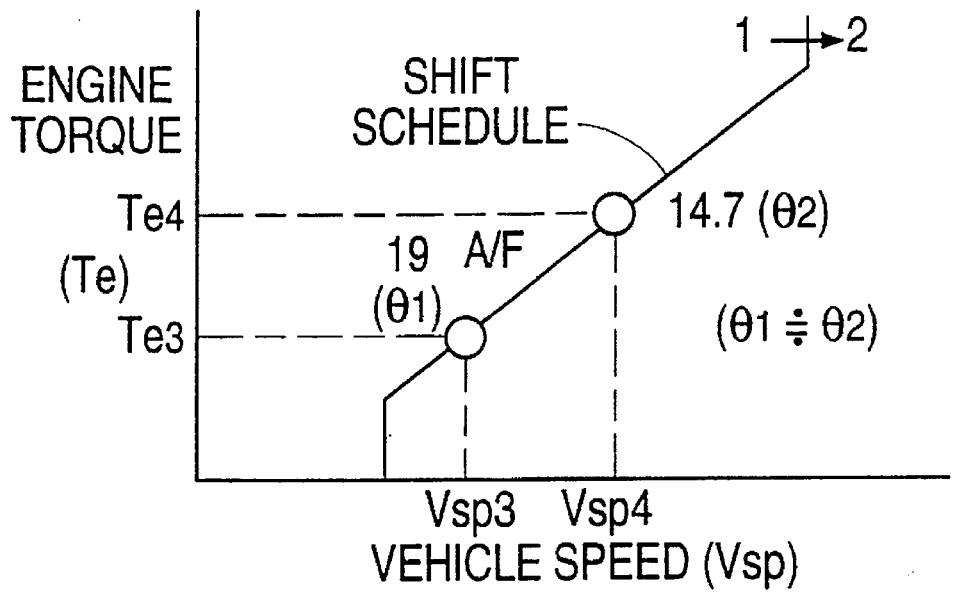
FIG. 12(a) is a change gear characteristic diagram according to the present invention using engine torque and vehicle speed as change gear parameters for explaining the timing change of gear change depending on the air/fuel ratio change.
Figure 12B:
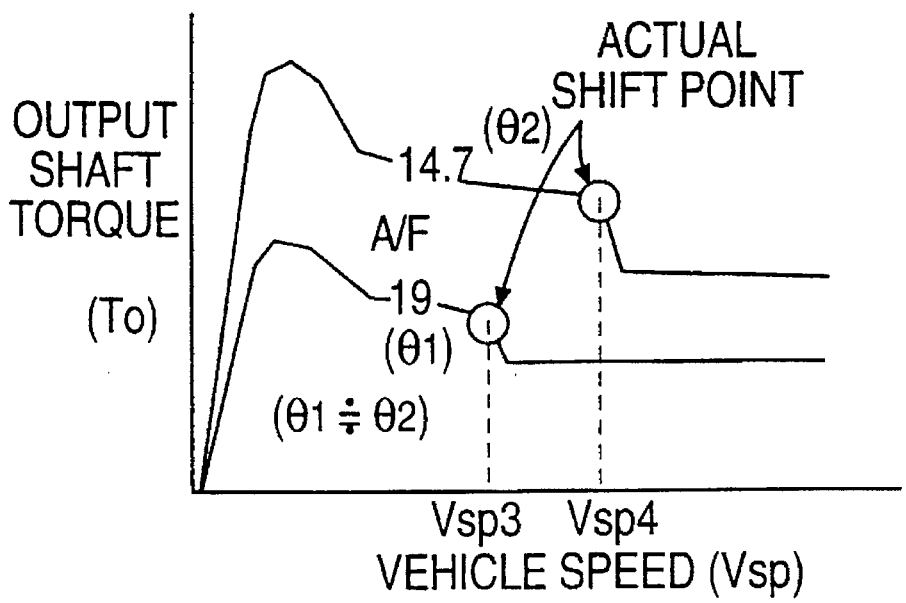
FIG. 12(b) is a graph illustrating a relationship between output shaft torque and vehicle speed for air/fuel ratios of 14.7 and 19 for explaining timings of gear change when the gear change is performed based on the change gear characteristic diagram according to the present invention as illustrated in FIG. 12(a)

FIG. 12($a$) and FIG. 12($b$) are diagrams for explaining advantages when the lean burn engine is combined with an automatic transmission according to the present invention which makes use of engine torque and vehicle speed as the gear shifting parameters instead of the conventional parameters. As seen from FIG. 12($a$), gear shifting is caused at vehicle speed Vsp3 for the engine torque Te3 and at vehicle speed Vsp4 for the engine torque Te4. Even if the throttle valve openings $\Theta1$ and $\Theta2$ are substantially the same, the vehicle speeds Vsp3 and Vsp4 at which the gear shifting is caused are substantially different. When assuming that an operating condition of the lean burn engine changes from at an A/F ratio of 14.7 to an A/F ratio of 19 due to factors such as fluctuation of the throttle valve opening from $\Theta2$ to $\Theta1$, and that the available output shaft torque characteristic changes suddenly from that for A/F of 14.7 to that for A/F of 19, as illustrated in FIG. 12($b$), the gear shifting is caused when the vehicle speed reaches Vsp3. This is substantially lower than Vsp4 and is reached in shorter time. Accordingly, a linear acceleration feeling can be realized in which the gear shifting is effected at respective optimum vehicle speeds as illustrated in FIG. 12($b$) depending upon variation of the output shaft torque characteristics which the driver wants to obtain.

Figure 13:
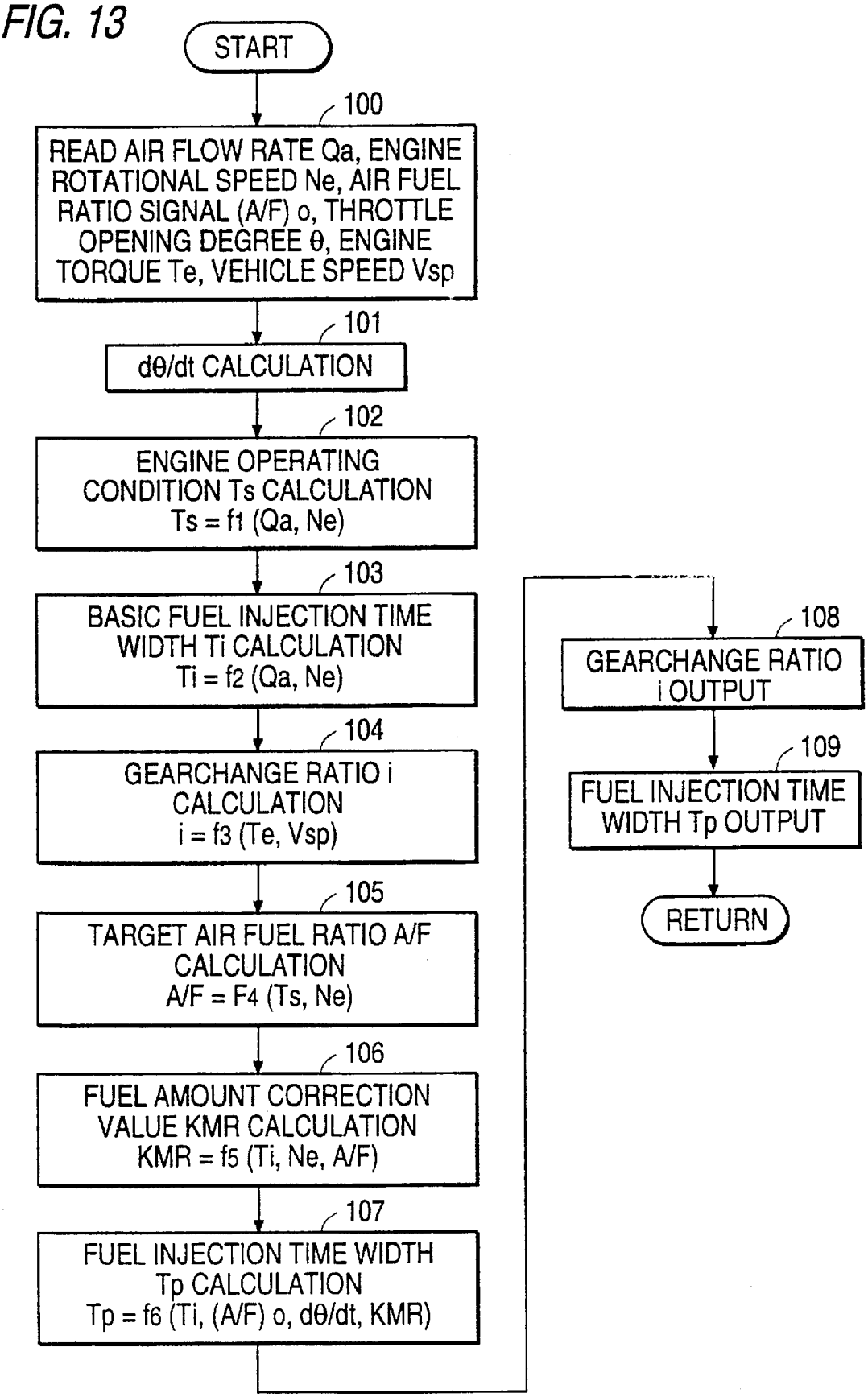
FIG. 13 is a flow chart for determining a gear change ratio i and a fuel injection time width Tp depending upon air flow rate Qa, engine rotational speed Ne, air fuel ratio signal $(A/F)_o$, throttle opening degree $\theta$, engine torque Te and vehicle speed Vsp.

FIG. 13 shows a flow chart for determining a gear change ratio i and a fuel injection time width Tp depending upon air flow rate Qa, engine rotational speed Ne, air fuel ratio signal $(A/F)_o$, a throttle opening degree $\theta$, engine torque Te and vehicle speed Vsp. In step 100, an air flow rate Qa, an engine rotational speed Ne, an air fuel ratio signal $(A/F)_o$, a throttle opening degree $\theta$, an engine torque Te and a vehicle speed Vsp are read. Subsequently, in step 101, a change rate $d\theta/dt$ in throttle opening degree is calculated which is used for correcting a fuel injection time width Tp such as during acceleration. In step 102, an engine operating condition Ts which corresponds to an engine torque is determined based on a function $f_1$ of the air flow rate Qa and the engine rotational speed Ne. In step 103, a basic fuel injection time width Ti is determined based on a function $F_2$ of the air flow rate Qa and the engine rotational speed Ne. In step 104, a gear change ratio i is determined based on a function $f_3$ of the engine rotational speed Ne and the vehicle speed Vsp. In step 105, a target air fuel ratio A/F, which is used when the air fuel ratio is varied depending upon engine driving conditions, is determined based on a function $f_4$ of the engine operating condition Ts and the engine rotational speed Ne. In step 106, a fuel amount correction value KMR is calculated based on a function $f_5$ of the basic fuel injection time width Ti which has been determined in step 103, the target air fuel ratio A/F which has been determined in step 105 and the engine rotational speed Ne. In step 107, a fuel injection time width Tp is calculated based on a function $f_6$ of the basic fuel injection time width Ti, the air fuel ratio signal (A/F) which has been obtained by converting a signal from, for example, an air fuel ratio sensor into an air fuel ratio, the throttle opening degree change rate $d\Theta/dt$ which has been determined in step 101 and the fuel amount correction value KMR which has been determined in step 106. Finally, in steps 108 and 109, the gear change ratio i and the fuel injection time width Tp are respectively outputted to complete the processing.

Figure 14:
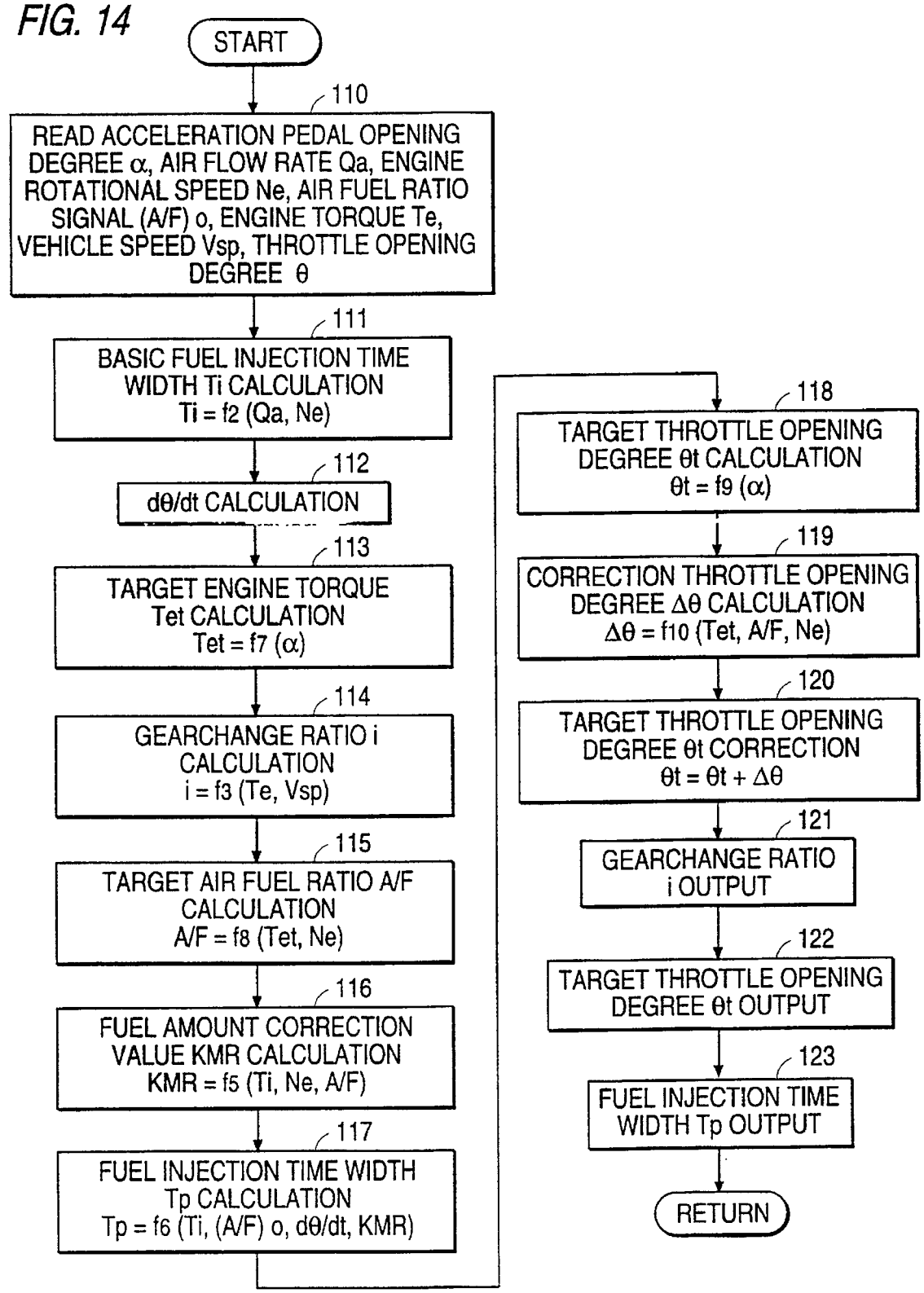
FIG. 14 is a flow chart for determining a gear change ratio i, a target throttle opening degree $\theta$ t and a fuel injection time width Tp depending upon acceleration pedal opening degree $\alpha$, air flow rate Qa, engine rotational speed Ne, air fuel ratio signal $(A/F)_o$, throttle opening degree $\theta$, engine torque Te and vehicle speed Vsp.

FIG. 14 shows a flow chart for determining a gear change ratio i, a target throttle opening degree $\theta t$ and a fuel injection time width Tp depending upon acceleration pedal opening degree $\alpha$, air flow rate Qa, engine rotational speed Ne, air fuel ratio signal $(A/F)_o$, throttle opening degree $\Theta$ engine torque Te and vehicle speed Vsp. In step 110, an acceleration pedal opening degree, $\alpha$, an air flow rate Qa, an engine rotational speed Ne, an air fuel ratio signal $(A/F)_o$, a throttle opening degree $\theta$, an engine torque Te and a vehicle speed Vsp are read. Subsequently, in step 111, a basic fuel injection time width Ti is determined based on the rate Qa and function $f_2$ of the air flow rate and the engine rotational speed Ne. In step 112, a throttle opening degree change rate $d\theta/dt$ is calculated which is used for correcting a fuel injection time width Tp such as during acceleration. In step 113, in order to obtain an engine torque corresponding to an acceleration pedal opening degree a target engine torque Tet is calculated based on a function $f_7$ of the acceleration pedal opening degree $\alpha$. In step 114, a gear change ratio i is determined based on the function $f_3$ of the engine torque Te and the vehicle speed Vsp. In step 115, a target air fuel ratio A/F, which is used when an air fuel ratio is varied depending upon engine driving conditions, is determined based on a function $f_8$ of the target engine torque Tet and the engine rotational speed Ne. In step 116, a fuel amount correction value KMR is calculated based on the function $f_5$ of the basic fuel injection time width Ti which has been determined in step 111, the target air fuel ratio A/F which has been determined in step 115 and the engine rotational speed Ne. In step 117, a fuel injection time width Tp is calculated based on the function $f_6$ of the basic fuel injection time width Ti, the air fuel ratio signal $(A/F)_o$ which has been obtained by converting a signal from, for example, an air fuel ratio sensor into an air fuel ratio, the throttle opening degree change rate dθ/dt which has been determined in step 112 and the fuel amount correction value KMR which has been determined in step 116. In step 118, an initial target throttle opening degree θt is calculated based on a function $f_9$ of the acceleration pedal opening degree. In step 119, a correction throttle opening degree Δθ is calculated based on a function $f_{10}$ of the target engine torque Tet which has been obtained in step 113, the target air fuel ratio A/F which has been determined in step 115 and the engine rotational speed Ne. In step 120, a final target throttle opening degree θt is calculated. Finally in steps 121, 122 and 123 the gear change ratio i, the final target throttle opening degree θt and the fuel injection time width Tp are outputted to complete the processing. Further, the calculation based on the functions f in the above includes look-up table retrieval.

Figure 15:
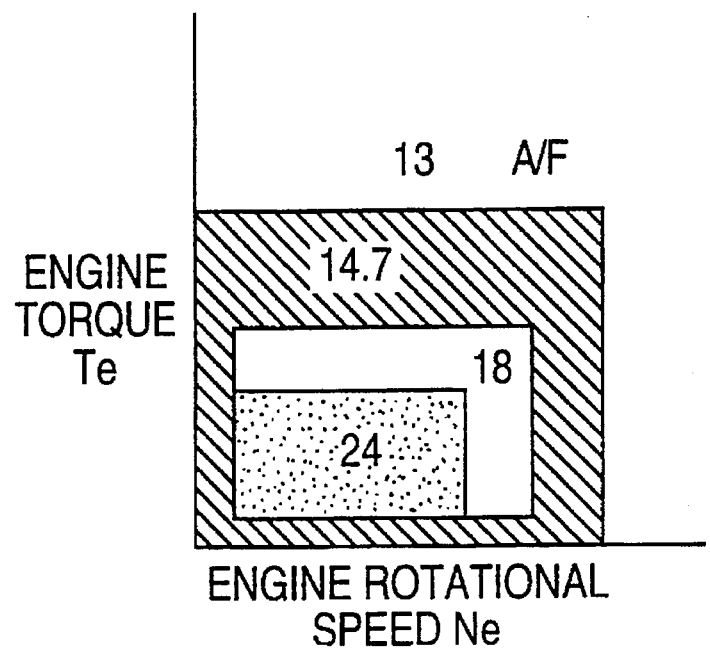
FIG. 15 is an engine characteristic diagram depending upon variation of air fuel ratio ranges.

FIG. 15 shows an engine characteristic diagram depending upon change in air fuel ratio range. It will be understood from FIG. 15 that in order to achieve compatibility between fuel economy and driving performance (in that feeling of good acceleration) in connection with a lean burn internal combustion engine it is necessary to change air fuel ratio based on the engine torque and the engine rotational speed. For example, in case when both engine rotational speed and engine torque are small, it is necessary to keep the air fuel ratio at 14.7 to, for example, prevent an engine stall. In case of a partial load, the air fuel ratio is kept at a lean mixture gas such as at 24 and 18 to achieve a fuel cost reduction. In case when both engine rotational speed and engine torque are large, the air fuel ratio of the mixture gas generating an output is selected as 13 to improve an acceleration feeling.

Figure 16:
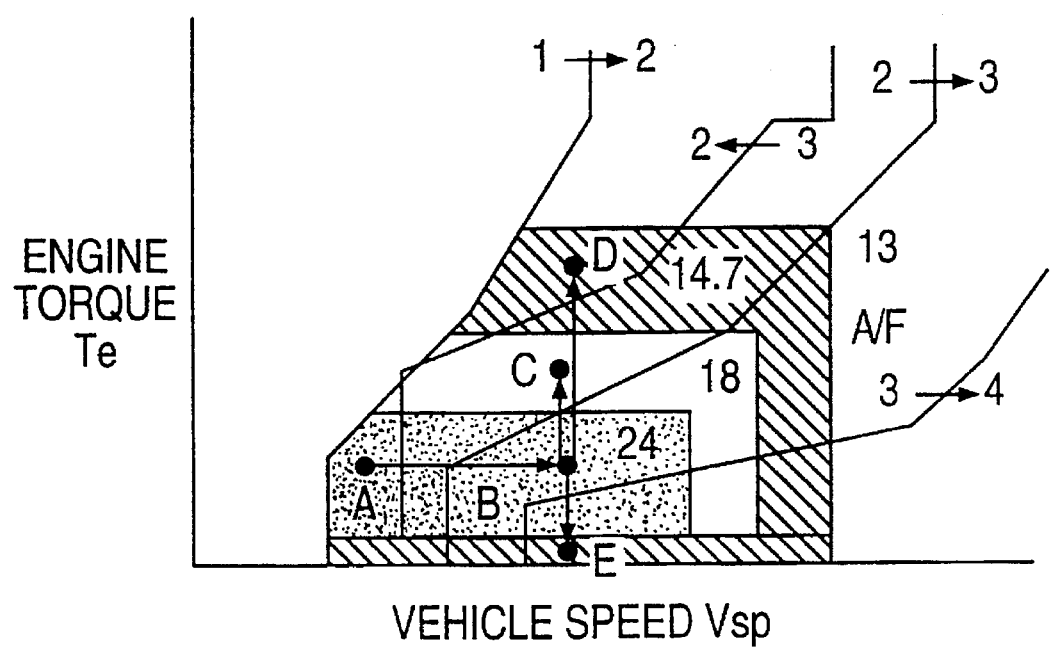
FIG. 16 is a combined diagram of a lean burn engine characteristic diagram and a characteristic gear change diagram therefor.

FIG. 16 is a diagram developed in a form of gear change board diagram of the characteristics shown in FIG. 15. When assuming that a motor vehicle equipped with an automatic transmission having the characteristic as shown in FIG. 16 is travelling with the second gear under a driving condition A, several driving patterns are conceivable. In a driving pattern 1, under the instant condition the vehicle speed increases and the driving condition shifts into a driving condition B, in this instance the air fuel ratio remains unchanged at 24. However, a gear change from the second gear to the third gear is caused. In a driving pattern 2, the motor vehicle is accelerated from the driving condition B to a driving condition C in which only the air fuel ratio varies. In a driving pattern 3, the engine torque under the driving condition B increases much and the driving condition moves from the driving condition B to a driving condition D in which the air fuel ratio changes as well as the gear changes from the third gear to the second gear. In a driving pattern 4, the engine torque under the driving condition B decreases and the driving condition moves from the driving condition B to a driving condition E in which the air fuel ratio changes as well as the gear changes from the third gear to the fourth gear. It will be understood from the above explanation that in a motor vehicle propelled by a lean burn engine equipped with an automatic transmission causes affecting engine torque fluctuation increase which require complex controls.

FIG. 17 through FIG. 20 show time charts corresponding to the above driving patterns.

Figure 17:
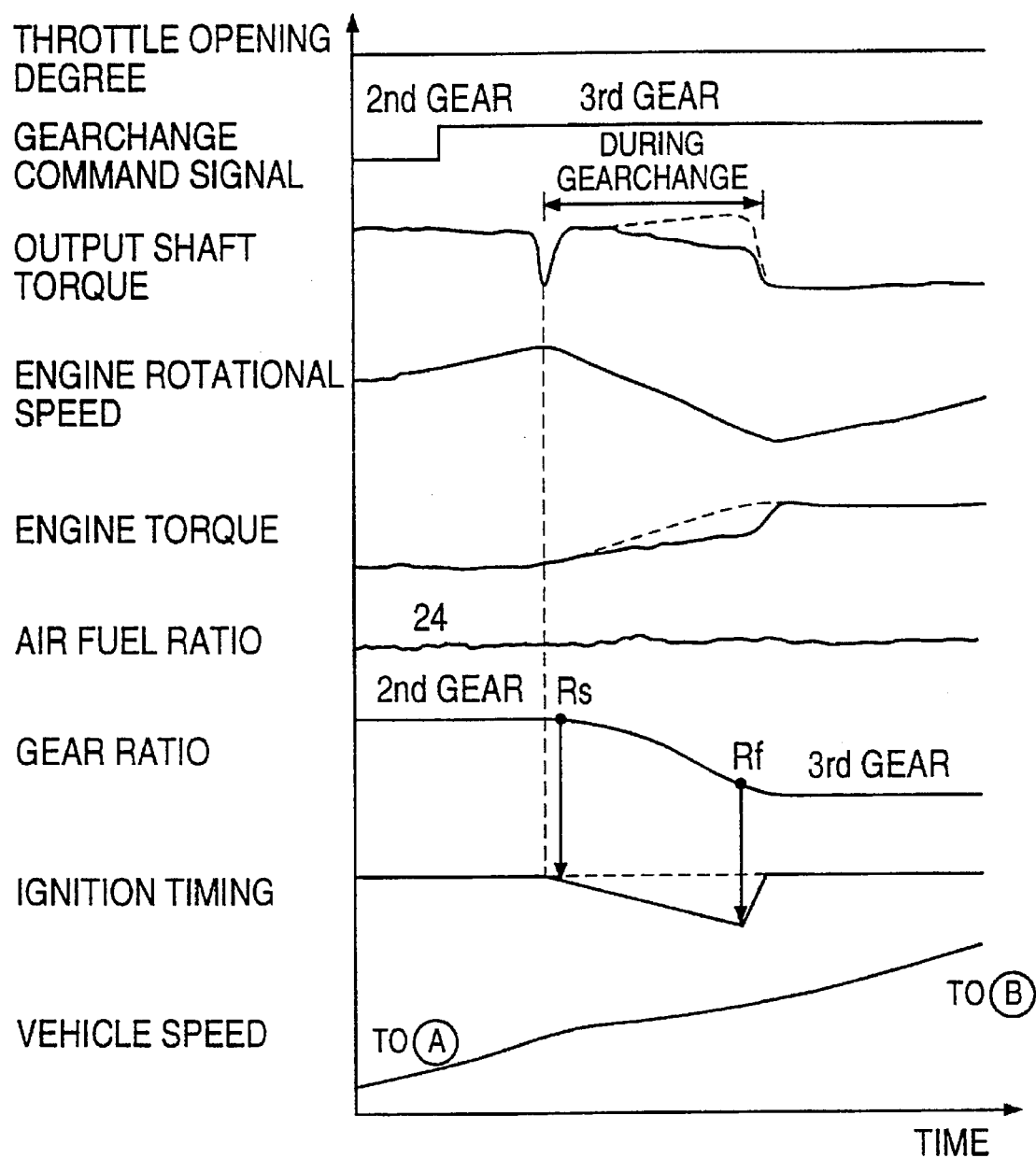
FIG. 17 is a time chart of output shaft torque, engine rotational speed, engine torque, air fuel ratio, gear ratio during gear change, ignition timing and vehicle speed during the time when the driving condition of a motor vehicle is moved from point A to point B in FIG. 16, in that, the throttle opening degree remains unchanged, but the gear is shifted up from the second gear to the third gear.

FIG. 17 corresponds to the driving pattern 1 in which the gear changes from the second gear to the third gear. When the vehicle speed increases and the driving condition A moves to the driving condition B, the gear change is caused. In case of the dash lines, since the air fuel ratio and the ignition timing are kept unchanged, the output shaft torque increases during the gear change operation and shock caused by the gear change increases. For avoiding such inconvenience, by making use of a signal indicative of a gear ratio during gear change, in that, the ratio of output shaft rotating number of the torque converter/output shaft rotating number of the transmission, the ignition timing is retarded during the gear change operation as illustrated by solid lines to decrease the engine torque, and thereby reduce the shock caused by the gear change operation.

Figure 18:
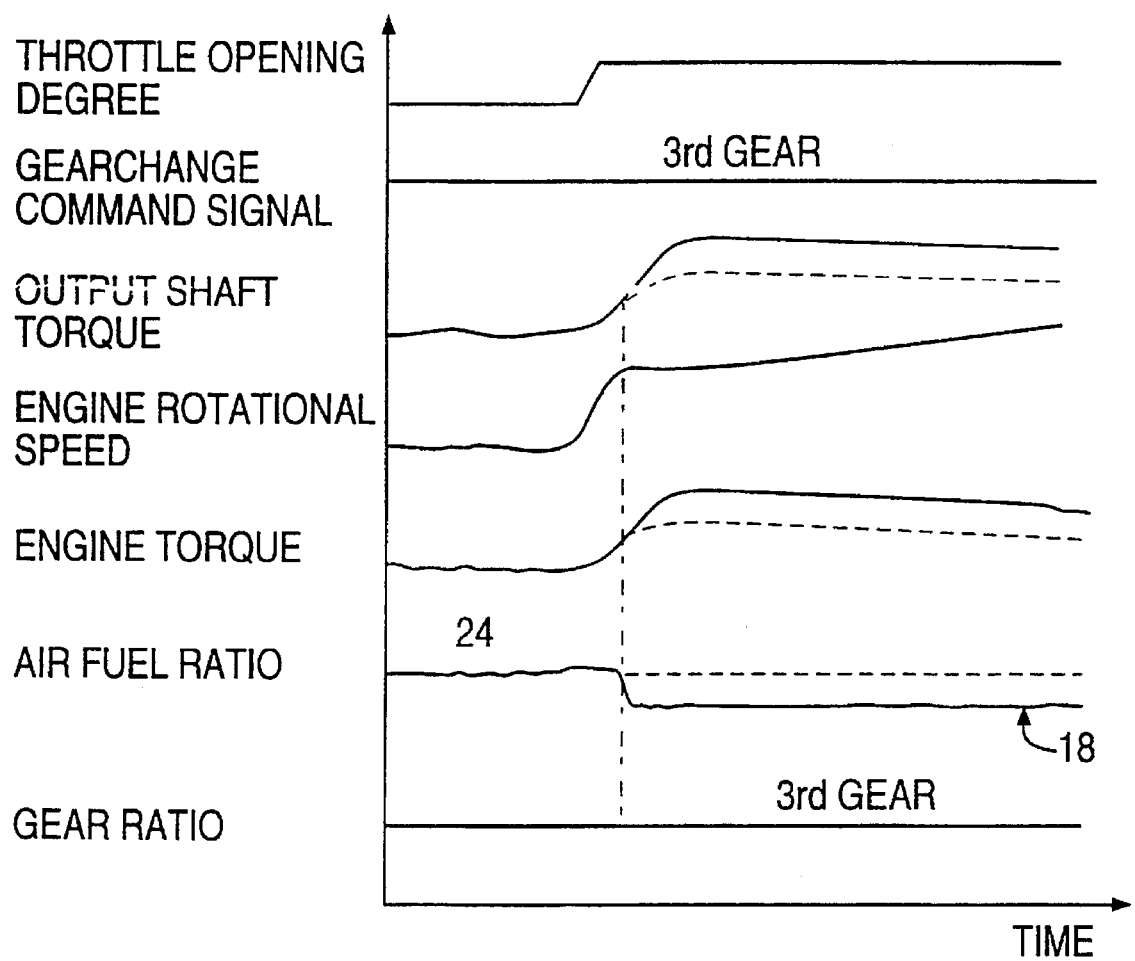
FIG. 18 is a time chart of output torque, engine rotational speed engine torque, air fuel ratio and gear ratio during the time when the driving condition of the motor vehicle is moved from point B to point C in FIG. 16, in that, the throttle opening degree is increased, but the gear remains unchanged.

FIG. 18 corresponds to the driving pattern 2, in which the air fuel ratio changes from 24 to 18, in that, the throttle opening degree is increased, the engine torque rises and the air fuel ratio changes. As illustrated by dash lines, if the air fuel ratio is not changed the engine torque increases slowly. However, when the air fuel ratio is changed in response to the increase of the throttle valve opening degree as illustrated by the solid lines, the engine torque quickly increases in response to the air fuel ratio change, thereby acceleration feeling is improved.

Figure 19:
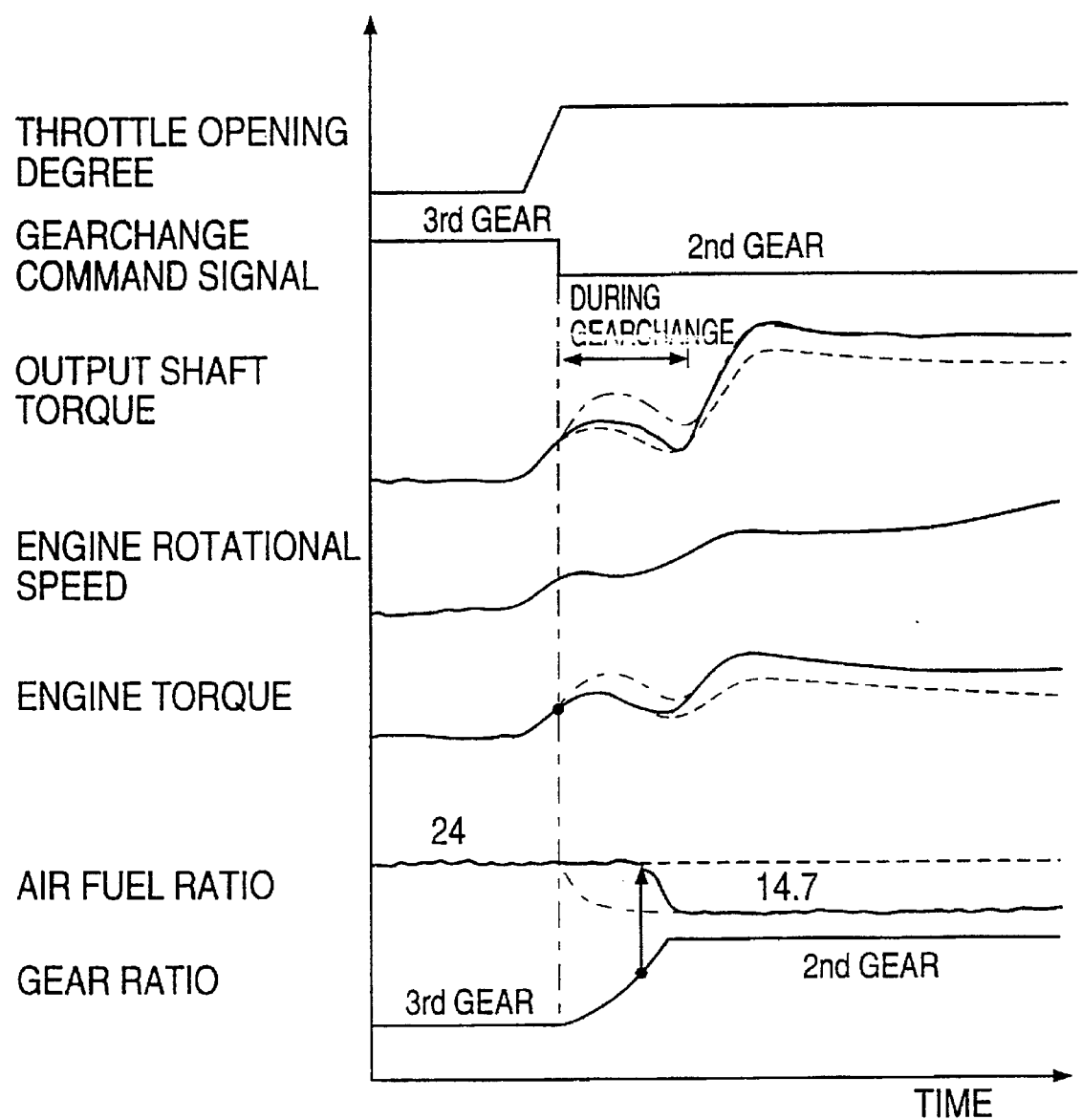
FIG. 19 is a time chart of output shaft torque, engine rotational speed, engine torque, air fuel ratio and gear ratio during gear change during the time when the driving condition of the motor vehicle is moved from point B to poinkt D in FIG. 16, in that, the throttle opening degree is increased as well as the gear is shifted down from the third gear to the second gear.

FIG. 19 corresponds to the driving pattern 3 in which the air fuel ratio is changed from 24 to 14.7 as well as the gear is shifted down from the third gear to the second gear. If only the shift down is caused without effecting the air fuel ratio change, the output shaft torque is pulled down because a part of the torque is used as an energy for increasing engine rotational speed during the gear change operation as illustrated by the dash lines, and at the same time when the gear change operation is completed the output shaft torque suddenly rises to give an acceleration feeling. However, in case of a motor vehicle propelled by such lean burn engine the shift down and the air fuel ratio change are likely to be caused simultaneously. Therefore, when the throttle valve is opened largely and the gear change signal and the air fuel ratio change are caused simultaneously due to the change of engine torque, the output shaft torque rises during the gear change operation in two step acceleration, of which the driver feels as a shock, as illustrated by two dot change lines. For avoiding such inconvenience, for the first time the gear change command signal is generated in response to the change of engine torque, and thereafter the air fuel ratio is changed at the condition near the completion of the gear change operation which is determined through detection of the gear ratio as illustrated by the solid lines. As a result, the driving performance, in that, the acceleration feeling during shift down, is improved.

Figure 20:
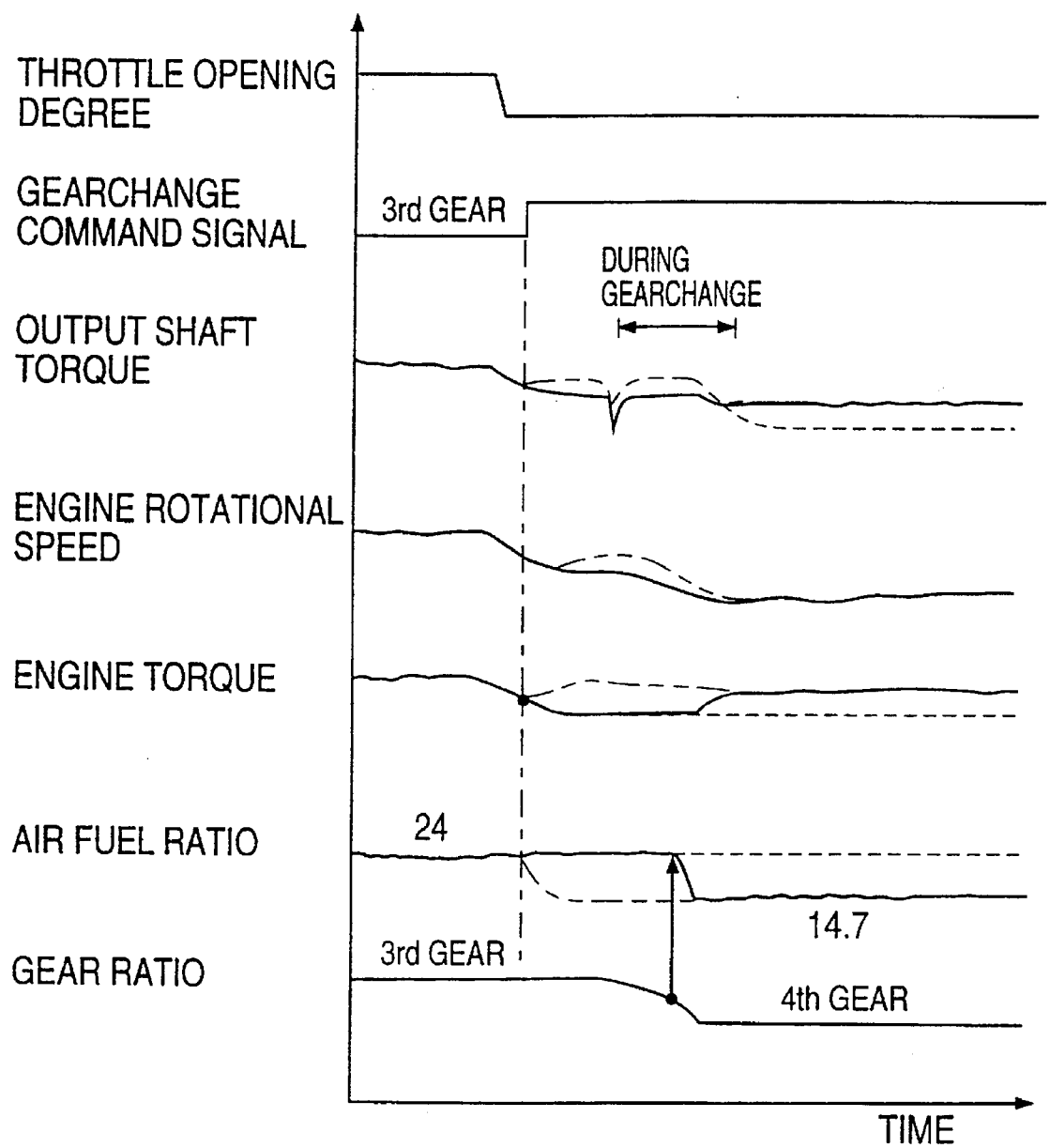
FIG. 20 is a time chart of output shaft torque, engine rotational speed, engine torque, air fuel ratio and gear ratio during gear change during the time when the driving condition of the motor vehicle is moved from point B to point E in FIG. 16, in that, the throttle opening degree is decreased and the gear is shifted up from the third gear to the fourth gear.

FIG. 20 corresponds to the driving pattern 4 in which the shift up due to removal of the foot from the acceleration pedal and the air fuel ratio change are caused simultaneously. If the air fuel ratio change is not caused, and only the gear change is performed in response to the decrease of engine torque, the output shaft torque fluctuates during the gear change operation and reduces after completion of the gear change operation. However, when the shift up due to removal of the foot from the acceleration pedal is caused in a motor vehicle propelled by a lean burn engine, the air fuel ratio change from 24 to 14.7 is likely accompanied therewith for preventing an engine stall. Therefore, if the gear change command signal and the air fuel ratio change are simultaneously generated in response to the engine torque decrease which is caused by the reduction of the throttle opening degree, the output shaft torque rises, which increases the gear change shock, as illustrated by the two dot chain lines. For avoiding such inconveniences, for the first time the gear change command signal is generated in response to the change of engine torque, and thereafter, the air fuel ratio is changed at a condition near the completion of the gear change which is determined through detection of the gear ratio change during gear change. As a result, the step like torque change during and after the gear change operation is eliminated and a reduction of the gear change shock is achieved.

Figure 21:
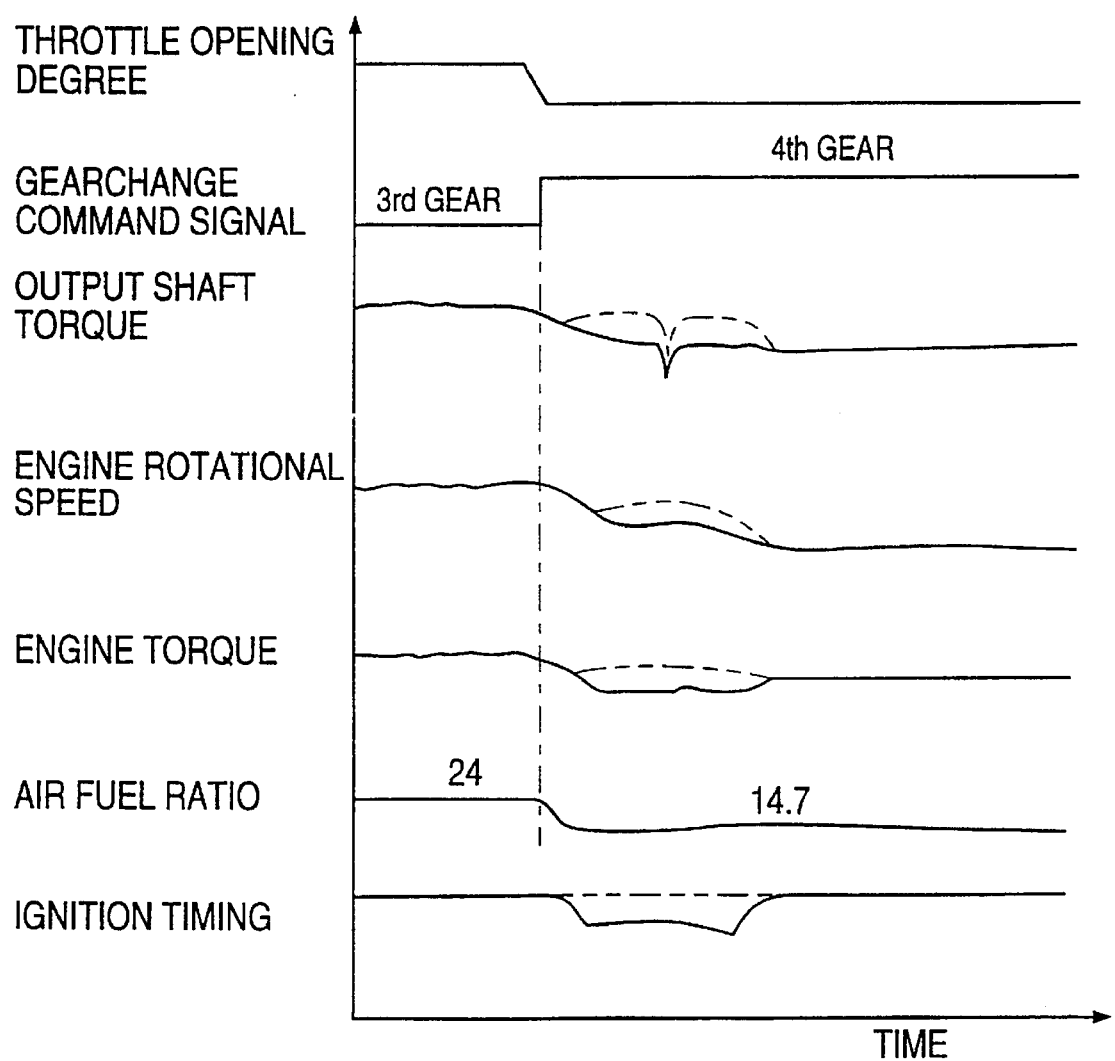
FIG. 21 is another time chart of output shaft torque, engine rotational speed, engine torque, air fuel ratio and ignition timing during the time when the driving condition of the motor vehicle is moved from point B to point E in FIG. 16, in that, the throttle opening degree is decreased and the gear is shifted up from the third gear to the fourth gear.

FIG. 21 shows another time chart for avoiding the above inconveniences in which an ignition timing control is combined with an air fuel ratio change. In case of the fourth driving pattern in FIG. 16 wherein the gear is shifted up through the removal of the foot from the acceleration pedal, the gear change command as well as air fuel ratio change are caused in response to an engine torque change. Accordingly, the output shaft torque increases in response to the change gear command signal output and a torque fluctuation is induced as illustrated by the two dot and chain lines. For preventing such inconvenience, in association with the air fuel ratio change the ignition timing is controlled to be retarded. As a result such torque fluctuation during gear change operation is relaxed.

Figure 22A:
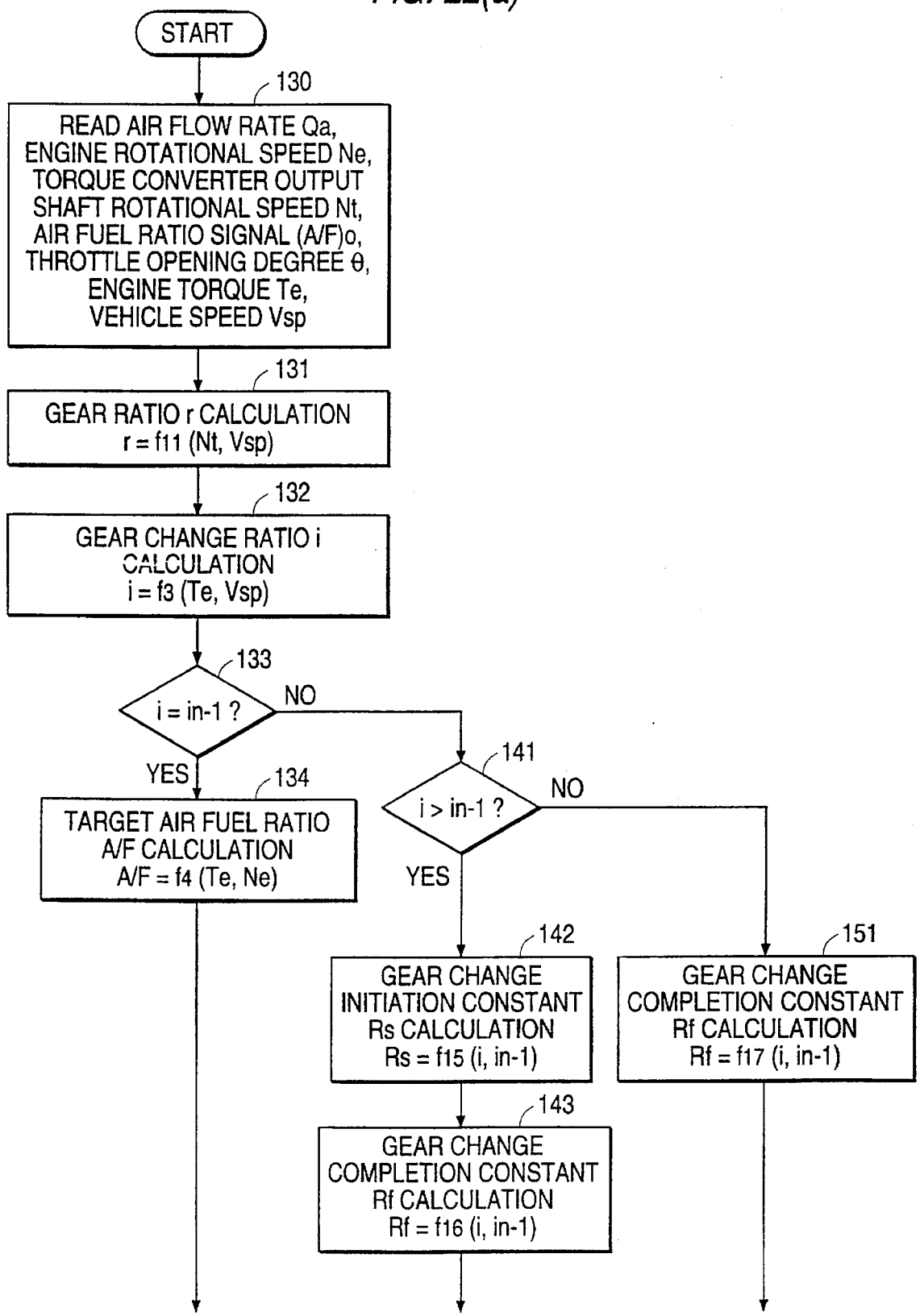
FIG. 22(a), FIG. 22(b) and FIG. 22(c) are inclusively a flow chart for performing the control sequence as exemplarily illustrated in FIG. 17 through FIG. 21.
Figure 22B:
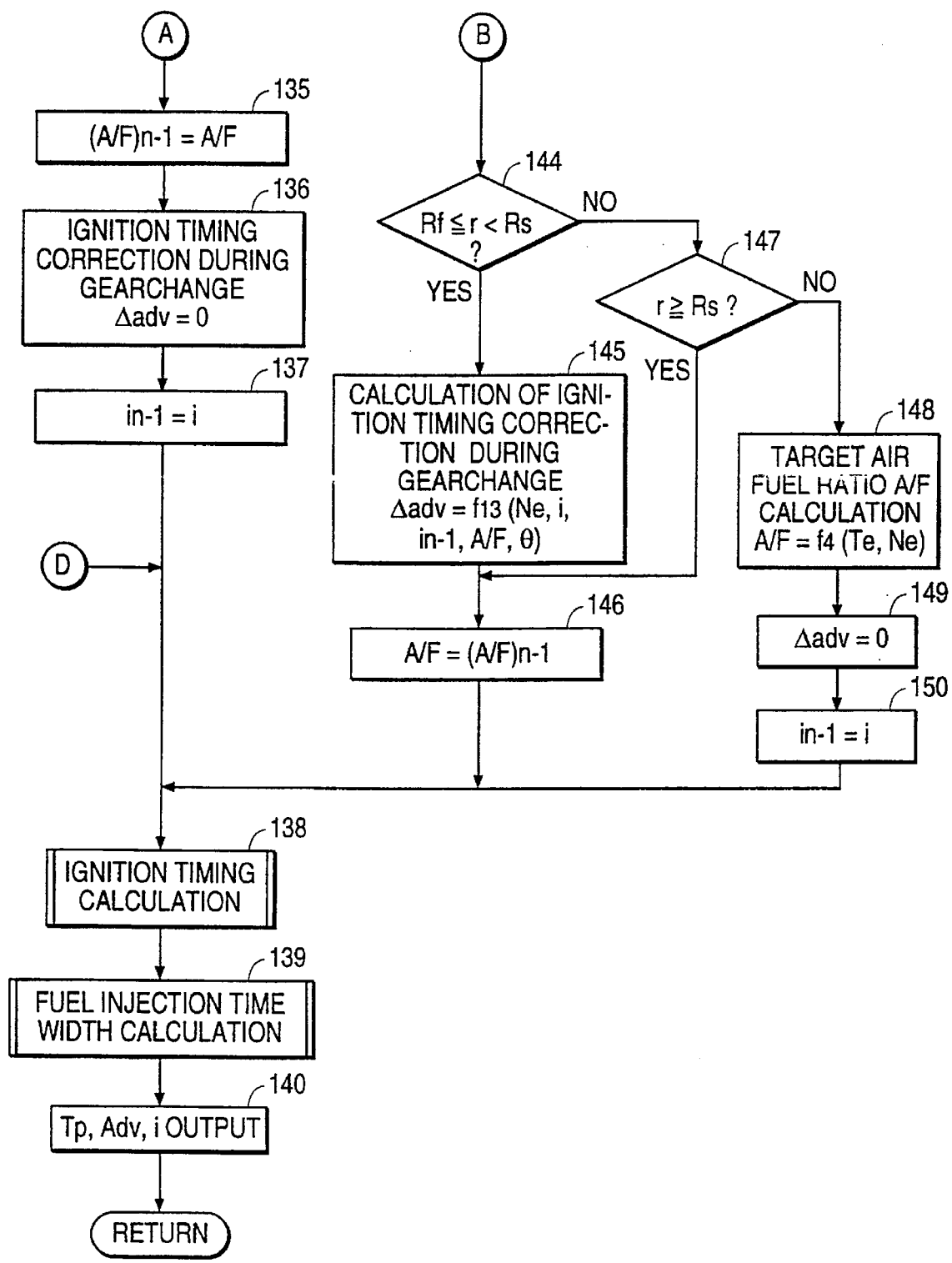
Figure 22C:
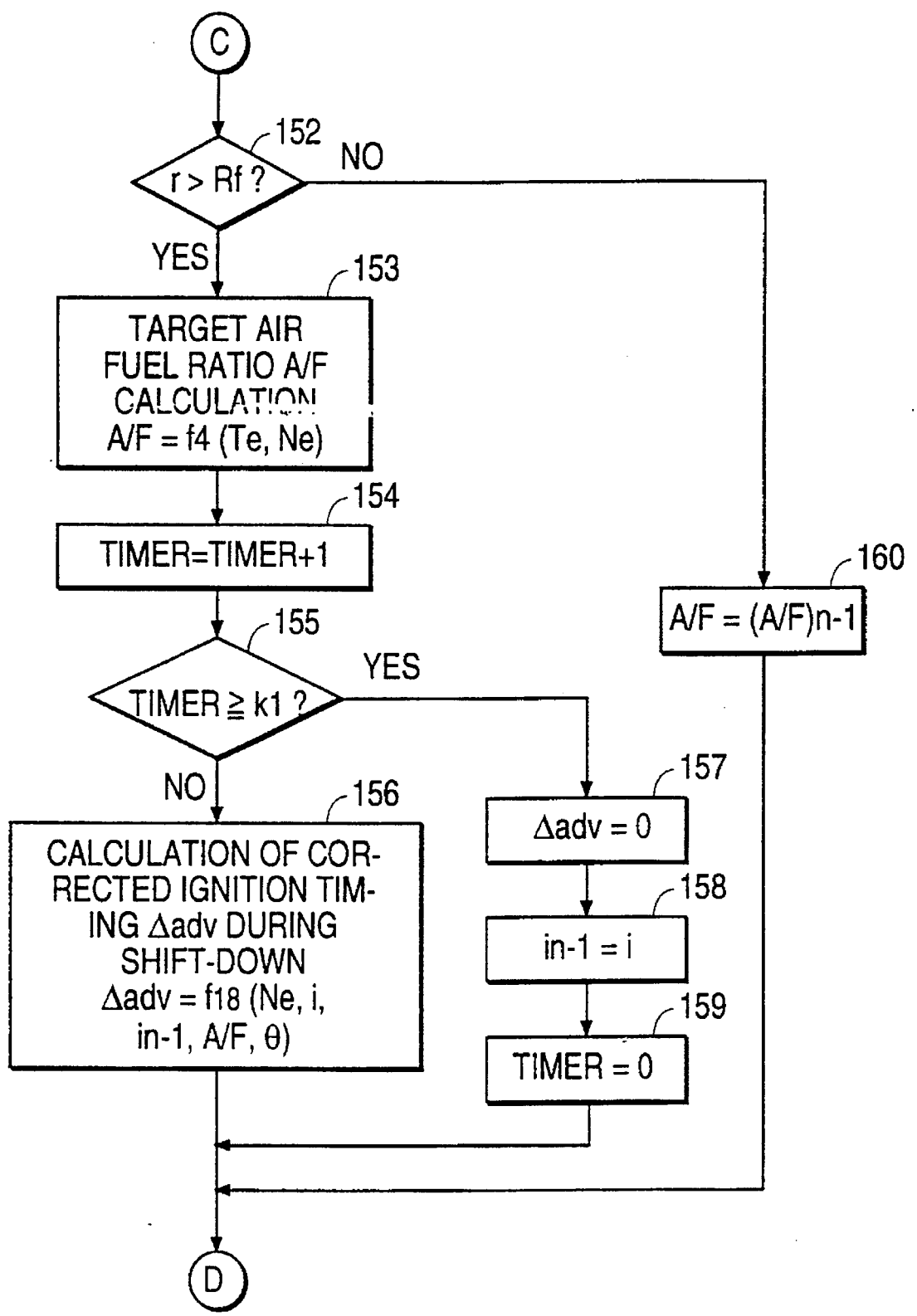

FIG. 22(a), 22(b) and 22(c) show control flow charts for the driving patterns as shown in FIG. 17 through FIG. 21.

Figure 23:
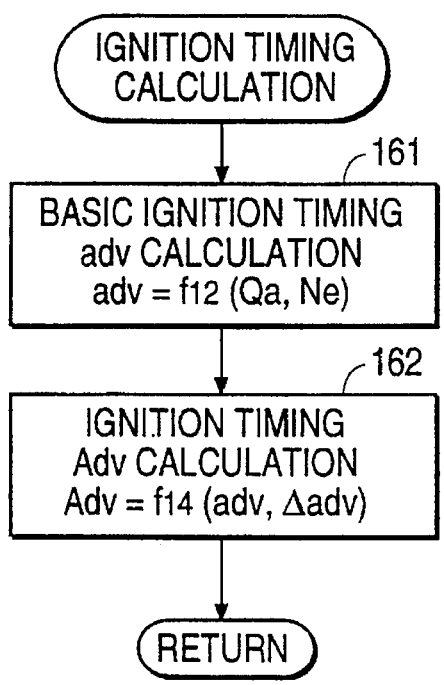
FIG. 23 is a subroutine flow chart for performing an ignition timing calculation as included in the flow chart shown in FIG. 22(a) through FIG. 22(c)
Figure 24:
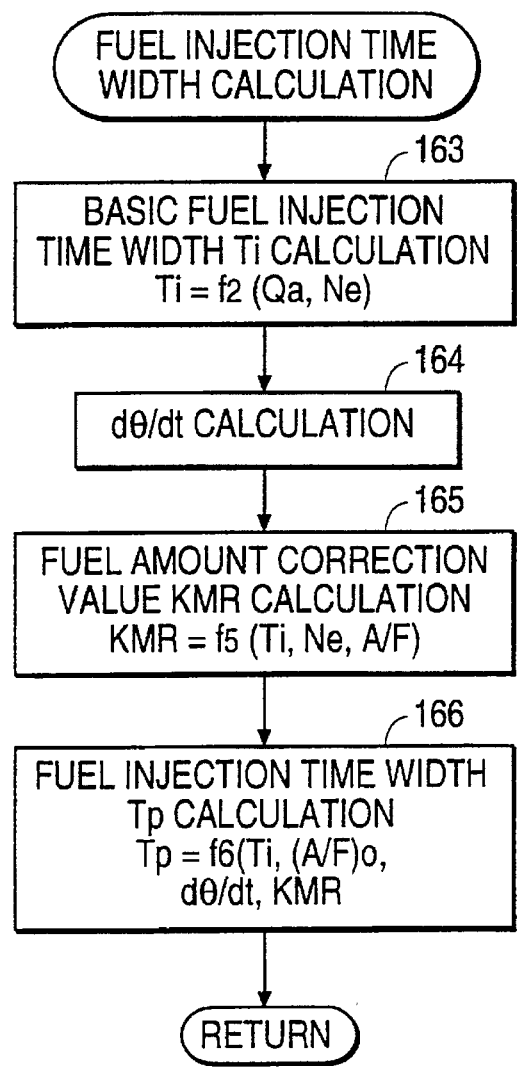
FIG. 24 is a subroutine flow chart for performing a fuel injection time width calculation as included in the flow chart shown in FIG. 22(a) through FIG. 22(c)

In step 130, an air flow rate Qa, an engine rotational speed Ne, a torque converter output shaft rotational speed Nt, an air fuel ratio signal $(A/F)_o$, a throttle opening degree θ, an engine torque Te and a vehicle speed Vsp are read. Subsequently, in step 131 the gear ratio indicative of a gear change operation is calculated based on a function $f_{11}$ of the torque converter ouput shaft rotational speed Nt and the vehicle speed Vsp. In step 132, the gear change ratio i is determined based on the function $f_3$ of the engine torque Te and the vehicle speed Vsp. In step 133, it is judged whether the present gear ratio i is equal to the previous gear change ratio i(n-1). In other words, whether a gear change command signal is generated is judged. When it is judged that both gear change ratios are equal, namely no gear change is caused, the process moves to step 134 wherein a target air fuel ratio A/F, which is used when the air fuel ratio is controlled depending upon engine driving conditions, is determined based on the function $f_4$ of the engine torque Te and the engine rotational speed Ne. In step 135, the present target air fuel ratio A/F is substituted for the previous target air fuel ratio (A/F)n-1 in order to determine, for example, the timing of a fuel amount control during gear change operation. In step 136, since there is no gear change, zero is substituted for the correction ignition timing Δ adv during gear change. Further, in step 137, the present gear ratio i is substituted for the previous gear change ratio i(n-1). In steps 138 and 139, subroutines for an ignition timing calculation and a fuel injection time width calculation (as illustrated in FIGS. 23 and 24) are respectively performed, and in step 140, a fuel injection time width Tp, an ignition timing Adv and a gear ratio i are outputted.

When the present gear change ratio i is determined as not equal to the previous gear change ratio i(n-1), namely a gear change is determined in step 133, the process proceeds to step 141 in which it is judged whether the present gear change ratio i is larger than the previous gear change ratio i(n-1) and when it is judged that the present gear change ratio is larger, namely in case of shift-up, the process proceeds to step 142 wherein a gear change initiation constant Rs is calculated based on a function $f_{15}$ of the present gear change ratio i and the previous gear change ratio i(n-1). Subsequently, the process advances to step 143 wherein a gear change completion constant $R_f$ is calculated based on a function $f_{14}$ of the present gear ratio and the previous gear change ratio i(n-1). In step 144, it is judged whether the gear ratio r during gear change operation which has been determined in step 131 is above the gear change initiation constant Rs determined in step 142 and below the gear change completion constant Rf determined in step 143. Namely, it is judged whether the gear change operation is underway, and when it is judged that the gear change operation is now underway the process proceeds to step 145 wherein a correction ignition timing Δ adv during gear change operation is determined based on the engine rotational speed Ne, the present gear change ratio i, the previous gear change ratio i(n-1), the air fuel ratio A/F and the throttle opening degree θ. Further, in step 146, the previous target air fuel ratio (A/F)n-1 is substituted for the present target air fuel ratio A/F in order to retard the initiation timing of the fuel amount control. Then, the process advances in the same manner as above to the steps 138, 139 and 140, and the determined fuel injection time width Tp, ignition timing Adv and gear change ratio i are outputted.

When it is judged that the gear change operation is not underway in step 144, the process proceeds to step 147 wherein it is judged whether the gear ratio r is above the gear change initiation constant Rs and when the gear ratio r is above the constant, namely in case before gear change initiation, the process proceeds to step 146 and further proceeds to steps 138, 139 and 140.

When it is judged that the gear ratio r is below the gear change initiation constant Rs in step 147, namely in case after gear change completion, the process proceeds to steps 148 wherein a target air fuel ratio A/F is determined based on the function $f_4$ of the engine torque Te and engine rotational speed Ne and then proceeds to step 149. In step 149, zero is substituted for the correction ignition timing Δ adv during gear change operation because of after-completion of gear change operation. Further, in step 150, the present gear change ratio i is substituted for the previous gear change ratio i(n-1). Then, in steps 138 and 139, the subroutines for the ignition timing calculation and the fuel injection time width calculation (as illustrated in FIG. 23 and FIG. 24) are performed. Finally, in step 140, the determined fuel injection time width Tp, ignition timing Adv and gear change ratio i are outputted.

Further, then it is judged in step 141 that the present gear change ratio i is less than the previous gear change ratio i(n-1). Namely, in the case of a shift-down the process proceeds to step 151 wherein the gear change completion constant Rf is calculated based on a function $f_{17}$ of the present gear change ratio i and the previous gear change ratio i(n-1). Then, the process proceeds to step 152 wherein it is judged whether the gear ratio r is larger than the gear change completion constant Rf and when the gear ratio r is larger than the constant, namely in case of gear change completion, the process proceeds to step 153 wherein a target air fuel ratio A/F is determined in order to perform the fuel amount control based on the function $f_4$ of the engine torque Te and the engine rotational speed Ne, and then the process proceeds to step 154. In step 154, a timer Timer is incremented which determines a control period for the ignition timing control during shift-down. Then the process proceeds to step 155 wherein it is judged whether the timer Timer counted in step 154 exceeds the ignition timing control period $K_1$, and when the counted time is determined below the period $K_1$, the process proceeds to step 156 wherein a correction ignition timing $\Delta$ adv during shift-down is determined based on a function $f_{18}$ of the engine rotational speed Ne, the present gear change ratio the previous gear change ratioi i(n−1), the air fuel ratio A/F and the throttle opening degree $\theta$, and then the process proceeds to step 138.

Further, when it is judged in step 155 that the timer Timer exceeds the ignition timing control period $K_1$, the process proceeds to step 157 wherein zero is substituted for the correction ignition timing $\Delta$ adv during shift-down. Further, in step 158 the present gear change ratio i is substituted for the previous gear change ratio i(n−1). In step 159 zero is substituted for the timer Timer and then the process proceeds to step 138.

When it is judged in step 152 that the gear ratio r is less than the gear change completion constant Rf, it is judged that the gear change operation is before completion and the process proceds to step 160 wherein the previous target air fuel ratio (A/F)n−1 is substituted for the present target air fuel ratio A/F, and then the process proceeds to step 138. As indicated above, it is preferable to perform an engine control during shift-down after the gear change is completed as illustrated in FIG. 19 in view of driving performance.

FIG. 23 shows a control flow chart for the ignition timing calculation subroutine which is referred to in FIGS. 22(a), 22(b) and 22(c). For the first time, in step 161, a basic ignition timing adv is calculated based on a function $f_{12}$ of the air flow rate Qa and the engine rotational speed Ne. Then in step 162, an ignition timing Adv is calculated based on a function $f_{14}$ of the basic ignition timing adv which has been determined in step 161 and the correction ignition timing $\Delta$ adv which has been determined in the process shown in FIG. 22(b) or FIG. 22(c).

FIG. 24 shows a control flow chart for the fuel injection time width calculation subroutine which is referred to in FIG. 22(a), 22(b) and 22(c). At first, in step 163, a basic fuel injection time width Ti is calculated based on the function $f_2$ of the air flow rate Qa and the engine rotational speed Ne. Subsequently, in step 164, a throttle opening degree change rate d$\theta$/dt is calculated which is used for correcting a fuel injection time width Tp such as during acceleration. Further, in step 165, a fuel amount correction value KMR is calculated based on a function $f_5$ of the basic fuel injection time width Ti which has been determined in step 163, the target air fuel ratio A/F which has been determined in the process shown in FIG. 22(a), 22(b) or 22(c) and the engine rotational speed Ne. Then, in step 166, the fuel injection time width Tp is calculated based on a function $f_6$ of the basic fuel injection time width Ti, the air fuel ratio signal (A/F)o obtained by converting a signal from an air fuel ratio sensor, the throttle opening degree change rate d$\theta$/dt which has been determined in step 165, and the fuel amount correction value KMR which has been determined in step 164.

Figure 25:
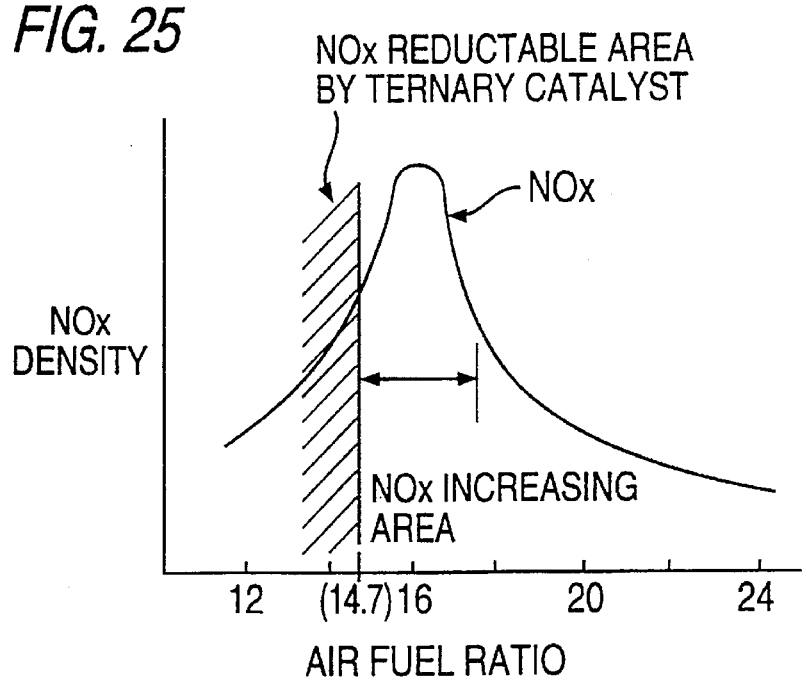
FIG. 25 is a diagram illustrating a relationship between air fuel ratio and NOx density.
Figure 26:
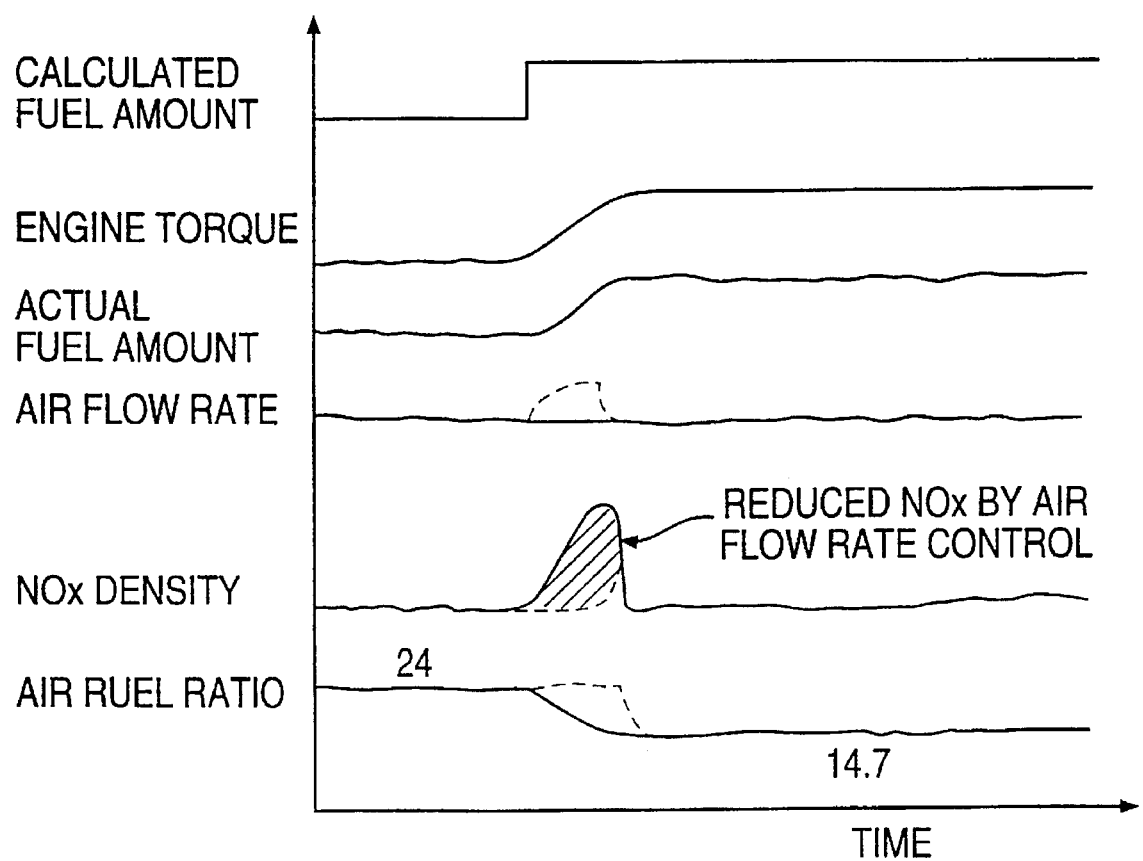
FIG. 26 is a time chart for explaining NOx suppression during air fuel ratio change through air flow rate control.
Figure 27:
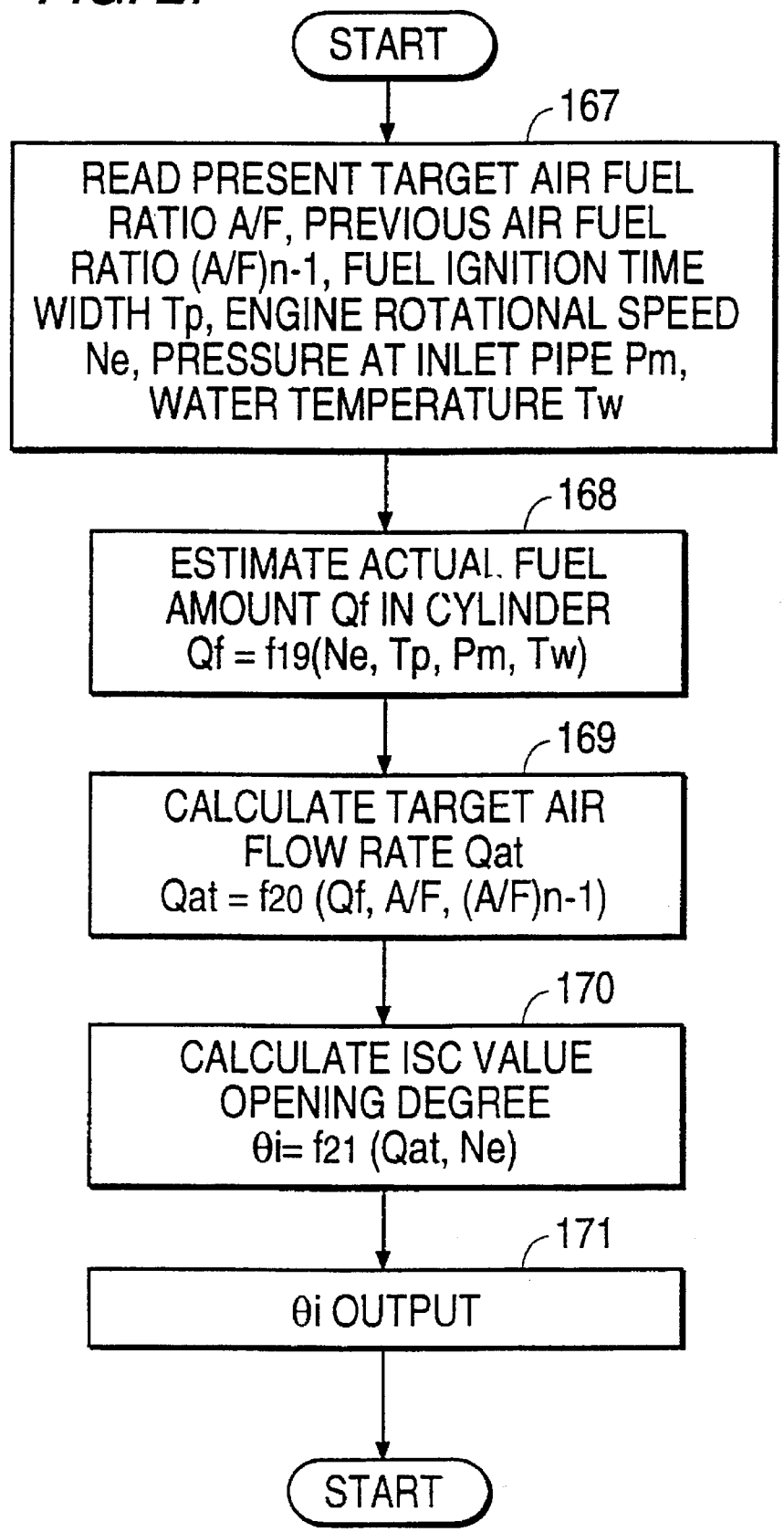
FIG. 27 is a flow chart for performing the control sequence as illustrated in FIG. 26.

FIG. 25 through FIG. 27 show a control measure for reducing NOx during change of air fuel ratio.

FIG. 25 shows a relationship between air fuel ratio and density of NOx. In currently used engines, a maximum NOx density appears at an air fuel ratio of about 16. Since the engines are conventionally controlled at an air fuel ratio below 14.7, reduction of NOx with a ternary catalyst is possible. However, in case of a lean burn engine, it is impossible to reduce NOx with such ternary catalyst, and a catalyst reducing NOx under an oxidizing atmosphere is indispensable. However, in addition to introduction of a NOx reduction catalyst for reducing Nox density, it is important to reduce NOx exhaust from the lean burn engine itself, for which purpose it is necessary to perform an engine operation while avoiding NOx increasing operation regions.

FIG. 26 shows a time chart for reducing NOx density. At first, assuming that the air flow rate is constant as indicated by a solid line and a calculated fuel amount is varied for changing the air fuel ratio, the fuel amount actually taken into a cylinder changes with a time lag as illustrated in FIG. 26. However, when the air flow rate is controlled as illustrated by a dash line in association with the actual fuel amount change, a region of increasing NOx generation is avoided and a reduction of NOx during change of air fuel ratio is achieved.

FIG. 27 shows a control flow chart for the air flow rate control during change of air fuel ratio. At first in step 167, the present target air fuel ratio A/F, the previous target air fuel ratio (A/F)n−1, the fuel injection timer width Tp, the engine rotational speed Ne, the pressure Pm in the inlet pipe and the water temperature Tw are read. Subsequently, the process proceeds to step 168 wherein an actual fuel amount Qf in the cylinder is estimated based on a function $f_{19}$ of the engine rotational speed Ne, the fuel injection time width Tp, the pressure Pm in the inlet pipe and the water temperature Tw. In step 169, a target air flow rate Qat, which corresponds to the estimated actual fuel amount Qf in the cylinder is determined based on a function $f_{20}$ of the actual fuel amount which has been determined in step 168, the present air fuel ratio A/F, and the previous air fuel ratio (A/F)n−1. Then, in step 170, an ISC (Idle Speed Control) valve opening degree $\theta$ i is calculated based on a function $f_{21}$ of the target air flow rate Qat which has been determined in step 169 and the engine rotational speed Ne, and the calculation result is outputted in step 171.

Figure 28:
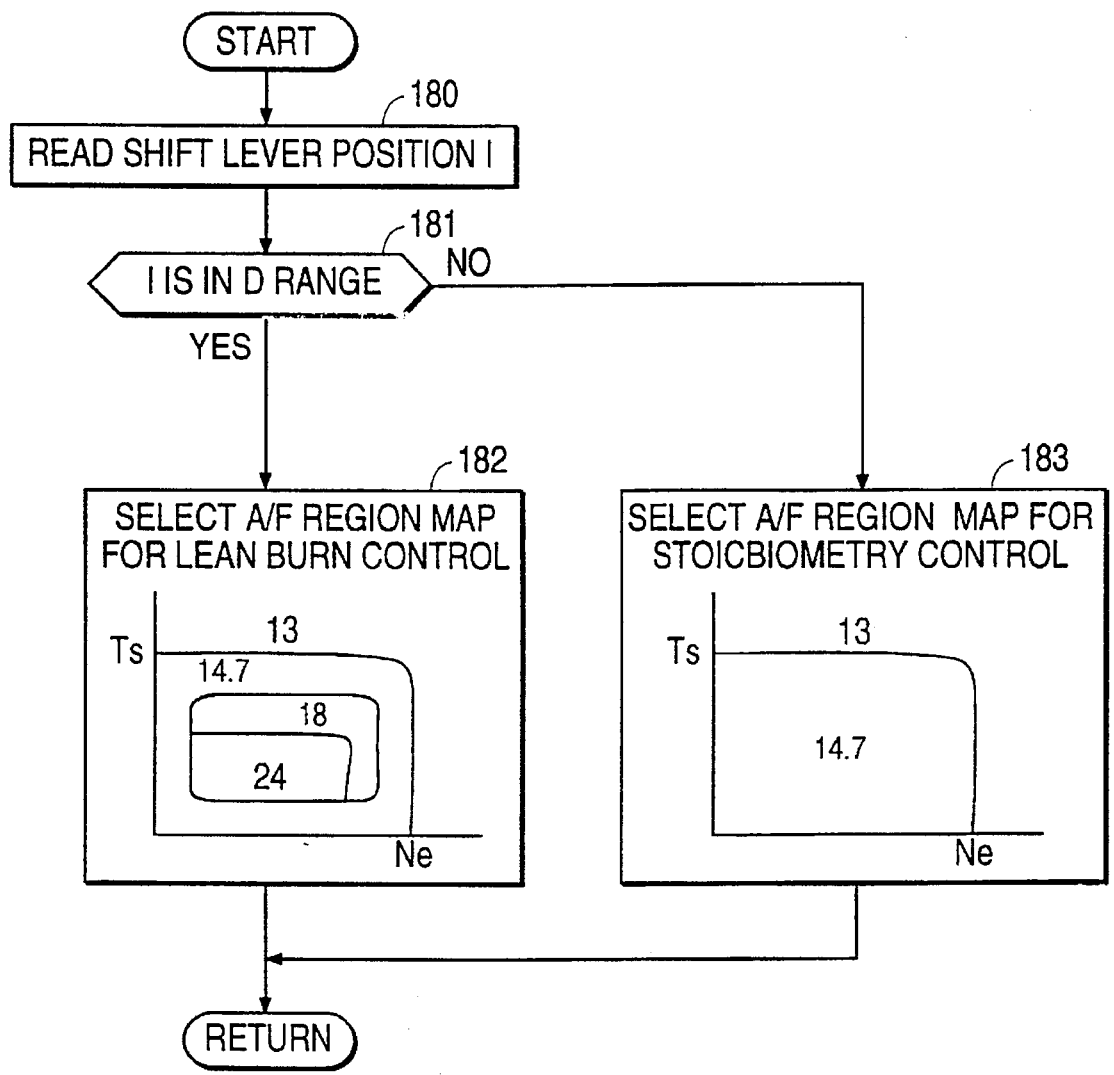
FIG. 28 is a block diagram for explaining selection control of air fuel ratio ranges depending upon shift lever positions.

FIG. 28 shows a diagram for explaining a selection control of air fuel ratio ranges depending upon a shift lever position. In step 180, at first the shift lever position I is read. In step 181, it is judged whether the shift lever position I is in D range in which the gear can be automatically changed to any reduction gear ratio provided in the automatic transmission mounted on the motor vehicle. In case of D range, the process proceeds to step 182 and selects an air fuel ratio range map for lean burn control to thereby perform lean burn control. However, when it is determined in step 181 that the shift lever position I is other than D range, namely, one of the first range which provides only first reduction gear ratio, the second range which provides first and second reduction gear ratios, R range which provides reversing reduction gear ratio, N range which provides neutral range and P range which provides parking range, the process proceeds to step 183 and selects an air fuel range map for stoichiometric control to therby perform a control which puts an importance on an operation at air fuel ratio of 14.7 during a partial load condition can be selected when the range contains a plurality of reduction gear ratios such as D range and second range.

It is to be understood that the above-described arrangements are simply illustrative of the application of the principles of this invention. Numerous other arrangements may be readily devised by those skilled in the art which embody the principles of the invention and fall within its spirit and scope.

We claim:

1. A method of controlling an internal combustion engine of a motor vehicle which is operated with air fuel mixture gas having air fuel ratio ranging from a fuel rich air fuel ratio to a fuel lean air fuel ratio depending on driving conditions of the motor vehicle and which is equipped with an automatic transmission of which gear change is determined based on a vehicle speed and an engine torque comprising the steps of:

(A) detecting gear ratio change when a shift-up command is generated while throttle opening degree is unchanged;
maintaining a fuel lean air fuel ratio unchanged; and
retarding ignition timing for the engine during gear change operation in response to the detection of the gear ratio change;

(B) detecting an instant when an engine torque exceeds a predetermined level when the throttle opening degree is increased without causing gear shifting; and
reducing air fuel ratio in response to the detection of engine torque exceeding the predetermined level;

(C) detecting gear ratio change when the throttle opening degree is increased and a shift-down command is generated; and
delaying the timing of air fuel ratio reduction toward the end of gear change operation in response to detection of the gear ratio change;

(D) detecting gear ratio change when the throttle opening degree is decreased and shift-up command is generated; and
delaying the timing of air fuel ratio reduction toward the end of gear change operation in response to the detection of the gear ratio change;

(E) detecting gear ratio change when the throttle opening degree is decreased and a shift-up command is generated;
reducing air fuel ratio in response to the shift-up command; and
retarding ignition timing for the engine during gear change operation in response to the detection of the gear ratio change.

2. A method of controlling an internal combustion engine of a motor vehicle which is operated with air fuel mixture gas having air fuel ratio ranging from a fuel rich air fuel ratio to a fuel lean air fuel ratio depending on driving conditions of the motor vehicle and which is equipped with an automatic transmission of which gear change is determined based on a vehicle speed and an engine torque comprising the steps of:
detecting the shift lever position of the automatic transmission; and
inhibiting engine operation with air fuel mixture gas having air fuel ratio at more than 14.7 when the shift lever position is determined to be other than a position which provides a plurality of reduction gear ratios.

3. A method of controlling an internal combustion engine of a motor vehicle which is operated with an air fuel mixture gas having air fuel ratios ranging from a fuel rich air fuel ratio to a fuel lean air fuel ratio depending on driving conditions of the motor vehicle and which is equipped with an automatic transmission of which gear change is determined based on a vehicle speed and an engine torque comprising the steps of:
detecting gear ratio change when a shift-up command is generated while a throttle opening degree is unchanged;
maintaining a fuel lean air fuel ratio unchanged; and
retarding an ignition timing for the engine during a gear change operation in response to the detection of the gear ratio change.

4. A method of controlling an internal combustion engine of a motor vehicle which is operated with an air fuel mixture gas having air fuel ratios ranging from a fuel rich air fuel ratio to a fuel lean air fuel ratio depending on driving conditions of the motor vehicle and which is equipped with an automatic transmission of which gear change is determined based on a vehicle speed and an engine torque comprising the steps of:
detecting an instant when an engine torque exceeds a predetermined level when a throttle opening degree is increased without causing gear shifting; and
reducing an air fuel ratio in response to the detection of an engine torque exceeding over the predetermined level.

5. A method of controlling an internal combustion engine of a motor vehicle which is operated with an air fuel mixture gas having air fuel ratios ranging from a fuel rich air fuel ratio to a fuel lean air fuel ratio depending on driving conditions of the motor vehicle and which is equipped with an automatic transmission of which gear change is determined based on a vehicle speed and an engine torque comprising the steps of:
detecting gear ratio change when a throttle opening degree is increased and a shift-down command is generated; and
delaying a timing of an air fuel ratio reduction toward the end of a gear change operation in response to the detection of the gear ratio change.

6. A method of controlling an internal combustion engine of a motor vehicle which is operated with an air fuel mixture gas having air fuel ratios ranging from a fuel rich air fuel ratio to a fuel lean air fuel ratio depending on driving conditions of the motor vehicle and which is equipped with an automatic transmission of which gear change is determined based on a vehicle speed and an engine torque comprising the steps of:
detecting gear ratio change when a throttle opening degree is decreased and a shift-up command is generated; and
delaying a timing of an air fuel ratio reduction toward the end of a gear change operation in response to the detection of the gear ratio change.

7. A method of controlling an internal combustion engine of a motor vehicle which is operated with an air fuel mixture gas having air fuel ratios ranging from a fuel rich air fuel ratio to a fuel lean air fuel ratio depending on driving conditions of the motor vehicle and which is equipped with an automatic transmission of which gear change is determined based on a vehicle speed and an engine torque comprising the steps of:
detecting gear ratio change when a throttle opening degree is decreased and a shift-up command is generated;
reducing an air fuel ratio in response to the shift-up command; and
retarding an ignition timing for the engine during a gear change operation in response to the detection of the gear ratio change.

8. A device for controlling an internal combustion engine of a motor vehicle which is operated with an air fuel mixture gas having air fuel ratios ranging from a fuel rich air fuel ratio to a fuel lean air fuel ratio comprising:
means for changing-over an air fuel ratio of the air fuel mixture gas depending on driving conditions of the motor vehicle;
an automatic transmission of which gear change is determined based on a vehicle speed and an engine torque; and means for offsetting a timing of an air fuel ratio changeover toward the end of a gear change operation, whereby an engine torque fluctuation during the gear change operation is suppressed.

9. A device for controlling an internal combustion engine of a motor vehicle which is operated with an air fuel mixture gas having air fuel ratios ranging from a fuel rich air fuel ratio to a fuel lean air fuel ratio comprising:

means for changing-over an air fuel ratio of the air fuel mixture gas depending on driving conditions of the motor vehicle;

an automatic transmission of which gear change is determined based on a vehicle speed and an engine torque; and means for retarding an ignition timing during a change gear operation, whereby an engine torque fluctuation during the gear change operation is suppressed.

10. A device for controlling an internal combustion engine of a motor vehicle which is operated with an air fuel mixture having an air fuel ratio ranging from fuel rich air fuel ratio to a fuel lean air fuel ratio comprising:

means for changing-over an air fuel ratio of the air fuel mixture gas depending on driving conditions of the motor vehicle;

an automatic transmission of which gear change is determined based on a vehicle speed and an engine torque; and means for retarding an ignition timing during a change gear operation spanning from generation of a shift command to completion of shifting operation, whereby an engine torque fluctuation during the gear change operation is suppressed.

* * * * *